United States Patent [19]

Hirasawa

[11] Patent Number: 5,164,756
[45] Date of Patent: Nov. 17, 1992

[54] CAMERA

[75] Inventor: Masahide Hirasawa, Kanagawa, Japan

[73] Assignee: Canon Kabushiki Kaisha, Tokyo, Japan

[21] Appl. No.: 860,236

[22] Filed: Mar. 27, 1992

Related U.S. Application Data

[63] Continuation of Ser. No. 546,384, Jun. 29, 1990, abandoned.

[30] Foreign Application Priority Data

Jul. 8, 1989 [JP] Japan .................................. 1-176868

[51] Int. Cl.⁵ .......................... G03B 13/36; G02B 7/28
[52] U.S. Cl. .................................... 354/400; 359/698; 358/227
[58] Field of Search ...................... 354/400, 402, 195.1, 354/195.12; 358/227, 225; 359/698

[56] References Cited

U.S. PATENT DOCUMENTS

| | | | |
|---|---|---|---|
| 4,920,369 | 4/1990 | Kaneda et al. ...................... | 354/400 |
| 4,935,763 | 6/1990 | Itoh et al. ........................... | 354/400 |
| 4,950,054 | 8/1990 | Wada et al. ......................... | 354/400 |

Primary Examiner—W. B. Perkey
Attorney, Agent, or Firm—Robin, Blecker, Daley & Driscoll

[57] ABSTRACT

A camera comprises a first lens group which is arranged to perform a power varying action, a second lens group arranged to adjust focus and to correct a change occurring in an image forming position according to the movement of the first lens group, a focus detection circuit arranged to detect the degree of focus, a memory arranged to store at least a standard speed at which the second lens group is moved to follow the movement of the first lens group without losing an in-focus state, a speed which is set to shift the image forming position forward relative to the standard speed and a speed which is set to shift the image forming position rearward relative to the standard speed; and a control circuit arranged to select from the memory the second lens group driving speed and to determine the driving direction according to the output of the focus detecting means and the moving direction of the first lens group.

31 Claims, 16 Drawing Sheets

| $F_{NO}$ | 1.4~2.8 | 2.8~5.6 | 5.6~11 | 11~22 | MORE THAN 22 |
|---|---|---|---|---|---|
| CORRECTION DEGREE m | $m_0$ | $m_1$ | $m_2$ | $m_3$ | $m_4$ |

FIG.13

| ZOOM AREA | 0 | 1 | 2 | 3 | 4 | 5 | --- | E | F |
|---|---|---|---|---|---|---|---|---|---|
| $V_{BFMAX}$ | $V_{BF00}$ | $V_{BF10}$ | $V_{BF20}$ | $V_{BF33}$ | $V_{BF43}$ | $V_{BF52}$ | --- | $V_{BFE0}$ | $V_{BFF0}$ |
| $V_{CBMAX}$ | $V_{CB06}$ | $V_{CB16}$ | $V_{CB25}$ | $V_{CB33}$ | $V_{CB43}$ | $V_{CB54}$ | --- | $V_{CBE5}$ | $V_{CBF7}$ |

FIG.16

CAMERA

This is a continuation application under 37 CFR 1.62 of prior application Ser. No. 546,384, filed June 29, 1990, now abandoned.

BACKGROUND OF THE INVENTION

1. Field of the Invention

This invention relates to a lens position control device for a camera which is adapted for a video apparatus such as a video camera and the like.

2. Description of the Related Art

The recent advancement of video apparatuses such as video cameras, etc., is conspicuous. They have come to have an automatic focusing (hereinafter referred to as an AF) function and a zoom lens in general. The zoom lens which has a zooming function is formed in a lens system consisting of, for example, four lens groups as shown in FIG. 1 of the accompanying drawings.

Referring to FIG. 1, the four-group lens system is arranged to permit a power varying operation and focus adjustment by changing the condition of the lens (such as shifting its position in the direction of the optical axis). The feature of the lens system varies according to the selection of lens groups that are to be movably arranged while others are arranged to be stationary.

In the case of FIG. 1, for example, a first lens group 1 is arranged to be stationary. A second lens group 2 is arranged to be a power varying zoom lens (hereinafter referred to as a V lens). A third lens group 3 (hereinafter referred to as a C lens) is provided for correcting a change of a focal plane resulting from a zooming action by correcting the image forming position and adjusting the focus. A fourth lens group 5 is arranged as an image forming system. A reference numeral 4 denotes an iris. A numeral 61 denotes the image sensing plane of an image sensor which is, for example, a CCD or the like.

FIG. 2 shows the positional relation obtained between the V lens and the C lens of the above-stated lens system when a zooming action is performed while keeping an in-focus state on the image sensing plane 61 for an object distance. In FIG. 2, the position of the V lens is shown on the axis of abscissa and that of the C lens on the axis of ordinate. The relation in position between the V and C lenses (hereinafter referred to as V-C curve) is shown with the object distance used as a parameter. The left end of the axis of abscissa indicates a point at which the shortest focal length is obtained (hereinafter referred to as the wide-angle end). The right end of the axis of abscissa indicates a point at which the longest focal length is obtained (hereinafter referred to as the telephoto end).

As is apparent from FIG. 2, the V-C curve changes the movement locus thereof according to the object distance. Therefore, an extremely complex mechanism is necessary if the V lens and the C lens are to be mechanically interlocked. To obtain means for correctly tracing the V-C curve with a simple mechanism, therefore, the following method is conceivable: The locus of each V-C curve is stored in an element such as a microcomputer or the like which is arranged to control the movement of the lens groups and the lens system is driven according to the stored values.

FIG. 3 diagramtically shows a method for storing the above-stated V-C curves in the microcomputer. The V-C curves vary their loci according to the object distance as mentioned above. However, the inclinations of adjacent V-C curves do not differ so much in most cases. Therefore, with the V-C curves divided into parts where the inclinations are about equal, the V-C curves shown in FIG. 2 can be divided into a plurality of discrete blocks as shown in FIG. 3. One representative inclination is assigned to each of the divided blocks. By this, the V-C curves of FIG. 2 can be discretely arranged.

Generally, the power varying speed of a zooming action is kept constant. Therefore, with this applied to FIGS. 2 and 3, the axis of abscissa can be replaced with a time base. Further, since the axis of ordinate indicates the degree of displacement of the C lens, the degree of the speed inclination given to each block can be treated as the speed of the C lens. Therefore, at the above-stated microcomputer, the moving or shifting speed of the C lens is stored for every one of the above-stated blocks. The speed computed on the basis of the $\vec{V}$-C curve for each of the blocks is hereinafter called $\vec{V}_{CZ}$.

The microcomputer is arranged to always grasp, during its operation, the position of the V lens and that of the C lens. When a zooming action is performed, the microcomputer makes a check to find the block to which the positional relation between the V and C lenses applies. The lens position is shifted to pass through these blocks at speeds predetermined for the applicable blocks. This makes it possible to discretely trace the V-C curve. As a result, the V-C curve can be approximately traced in an arcuate manner as shown in FIG. 2.

The above is a typical example of the V-C curve tracing arrangement generally employed for a zoom lens of the kind shown in FIG. 1.

In accordance with the above-stated arrangement, the current lens position is determined either according to the speed assigned to each block that has been passed during the zooming action or according to the speed assigned to a block to which the lens position is located immediately before commencement of the zooming action. However, this arrangement has presented the following problems:

(1) Referring to FIG. 2, it is difficult to shift the lens position from one of the V-C curves to another. When the object distance changes during the zooming action, therefore, it is difficult to bring the lens system into an in-focus position again.

(2) In a case where the lens system is not perfectly in focus immediately before commencement of the zooming action, the zooming action is performed on the lens system, leaving it in a blurred state as focus adjustment is impossible during the zooming action.

(3) The focusing accuracy lowers on the side of the wide-angle end W which gives a deeper depth of field. On the wide-angle side, therefore, the lens system tends to be considered in focus even when the lens position is not exactly on the V-C curve. Then, if the lens position is shifted toward a telephoto end T by the zooming action in this state, the degree of blur comes to increase accordingly as the depth of field becomes shallower.

(4) In a case where the lens is brought to a stop during the process of the zooming action for some reason, the adverse effect of this continues to cause the lens position to be shifted over wrong blocks until the end of the zooming action.

Lens position control devices of the above-stated kind are disclosed in U.S. patent applications Ser. No. 340,025 filed on Apr. 18, 1989, now U.S. Pat. No. 4,975,714, Ser. No. 346,630 filed on May 2, 1989, now U.S. Pat. No. 4,920,369, Ser. No. 359,388 filed on May 31, 1989, now U.S. Pat. No. 4,950,054, Ser. No. 359,730 filed on May 31, 1989, Ser. No. 362,265 filed on June 6, 1989, Ser. No. 399,700 filed on Aug. 28, 1989, etc., which are assigned to the assignee of the present invention.

SUMMARY OF THE INVENTION

This invention is directed to the solution of the above-stated problems of the prior art. It is, therefore, a first object to provide a camera which is capable of performing a zooming action without causing any blur by accurately correcting any deviation of a focal plane which varies according to the zooming action.

It is a second object of the invention to provide a camera which is capable of accurately performing a zoom action by adjusting focus during the zoom action.

It is a third object of the invention to provide a camera which is arranged to select the most apposite data from a speed data table which is stored beforehand for different states of the lens thereof and to be capable of controlling the lens with a minimum amount of data on the basis of the data thus selected.

To attain this object, a camera arranged according to this invention as a preferred embodiment thereof comprises: a first lens group which is arranged to perform a power varying action; a second lens group which is arranged to make focus adjustment and to correct a change taking place in an image forming position according to the movement of the first lens group; focus detecting means for detecting the degree of focus; storage means for storing at least a standard speed at which the second lens group is moved to follow the movement of the first lens group while maintaining an in-focus state, a speed which is set for shifting the image forming position forward relative to the standard speed in the optical axis direction and a speed which is set for shifting the image forming position rearward relative to the standard speed; and control means which is arranged to select the speed of driving the second lens group from the storage means and to determine the second lens group driving direction according to an output of the focus detecting means and the moving direction of the first lens group.

It is a fourth object of the invention to provide a camera which is arranged to correct a change taking place in the position of a focal plane while performing a zooming action; to be capable of adjusting focus according to a change taking place in an object to be photographed; and to be capable of adequately performing lens control for the various states of the optical system thereof, such as the depth of field, etc.

To attain that object, a camera arranged according to this invention as a preferred embodiment thereof comprises: a first lens group which is arranged to perform a power varying action; a second lens group which is arranged to make focus adjustment and to correct a change taking place in an image forming position according to the movement of the first lens group; focus detecting means for detecting the degree of focus; storage means for storing at least a standard speed at which the second lens group is moved to follow the movement of the first lens group while maintaining an in-focus state; and speed control means for correcting the standard speed according to an output of the focus detecting means and information on the depth of field and for controlling the direction and the degree of a correcting action on the image forming position.

It is a fifth object of the invention to provide a camera which is capable of speedily and naturally performing a zooming action and focus adjustment by correcting a change taking place in the position of a focal plane according to the zooming action and also by controlling the moving speed of a focusing lens according to the degree of focus.

Under the above-stated object, a camera which is arranged according to this invention as a preferred embodiment thereof comprises: a first lens group which is arranged to perform a power varying action; a second lens group which is arranged to make focus adjustment and to correct a change taking place in an image forming position according to the movement of the first lens group; focus detecting means for detecting the degree of focus; storage means for storing a standard speed at which the second lens group is moved to follow the movement of the first lens group while maintaining an in-focus state, a first speed which is set for shifting the image forming position forward relative to the standard speed in the direction of an optical axis and a second speed which is set for shifting the image forming position rearward relative to the standard speed, the standard, first and second speeds being stored for each of a plurality of lens group shifting areas respectively; and control means which is arranged to select from the storage means a second lens group driving speed and determine the direction of a driving action on the second lens group according to an output of the focus detecting means and the moving direction of the first lens group and to set either the first speed or the second speed at a maximum value thereof for the shifting area where the first lens group is located if the degree of focus is below a predetermined value.

It is a sixth object of the invention to provide a camera which is arranged to be capable of reliably correcting at once any deviation from an in-focus point caused by a change taking place in the object distance during a zooming action irrespectively of the direction of the zooming action; to be capable of reliably attaining an in-focus state even in cases where the zooming action begins before an in-focus state is attained; to be capable of accurately correcting defocus; and to be capable of driving the lens system thereof without causing any conspicuous blur during the zooming action.

To attain the sixth object, a camera having a lens system in which a lens moving locus varies in a complex manner in making focus correction after a power varying action is arranged to be capable of immediately and reliably correcting any deviation from an in focus point caused by a change taking place in the object distance during the process of the power varying action irrespectively of the direction of the power varying action. This enables the camera to perform the power varying action in a natural manner without causing any blur and to attain an in-focus state without fail even when the power varying action is performed while the lens system is not in focus before or after the action.

It is a seventh object of the invention to provide a camera which is arranged to be capable of accurately correcting a defocus state and to drive the lens thereof without causing any conspicuous blur during the process of a power varying action irrespectively of any change in the depth of field; to be capable of promptly bringing the lens back to an in-focus state even in the event of a sudden change taking place in an object distance during the process of a zooming action; and to be highly reliable despite of its simple arrangement without recourse to any complex mechanism or to any control program.

The above and other objects and features of the invention will become apparent from the following detailed description of embodiments thereof taken in connection to the accompanying drawings.

BRIEF DESCRIPTION OF THE DRAWINGS

FIG. 13 shows speed correction values to be used according to the depth of field in the control action of the second embodiment.

FIG. 16 shows speed setting for the control action of the third embodiment.

DETAILED DESCRIPTION OF THE PREFERRED EMBODIMENTS

Figure 1:
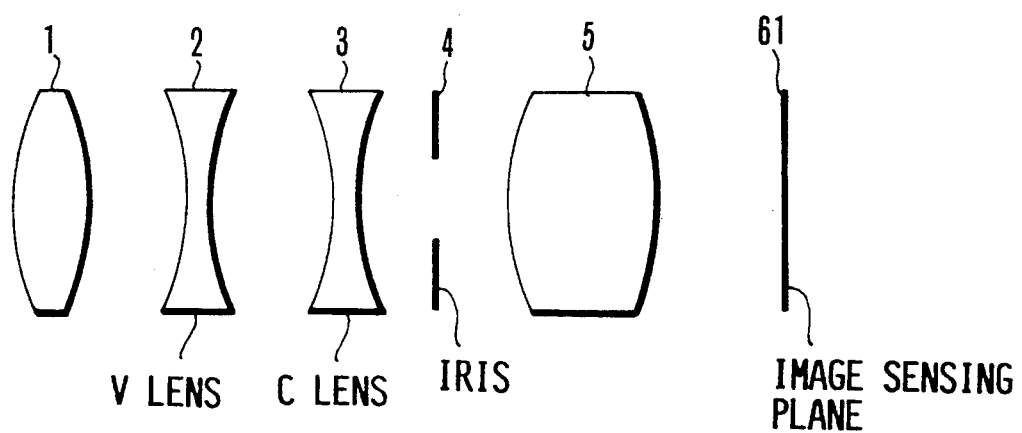
FIG. 1 shows a zoom lens of a typical four-group arrangement.
Figure 2:
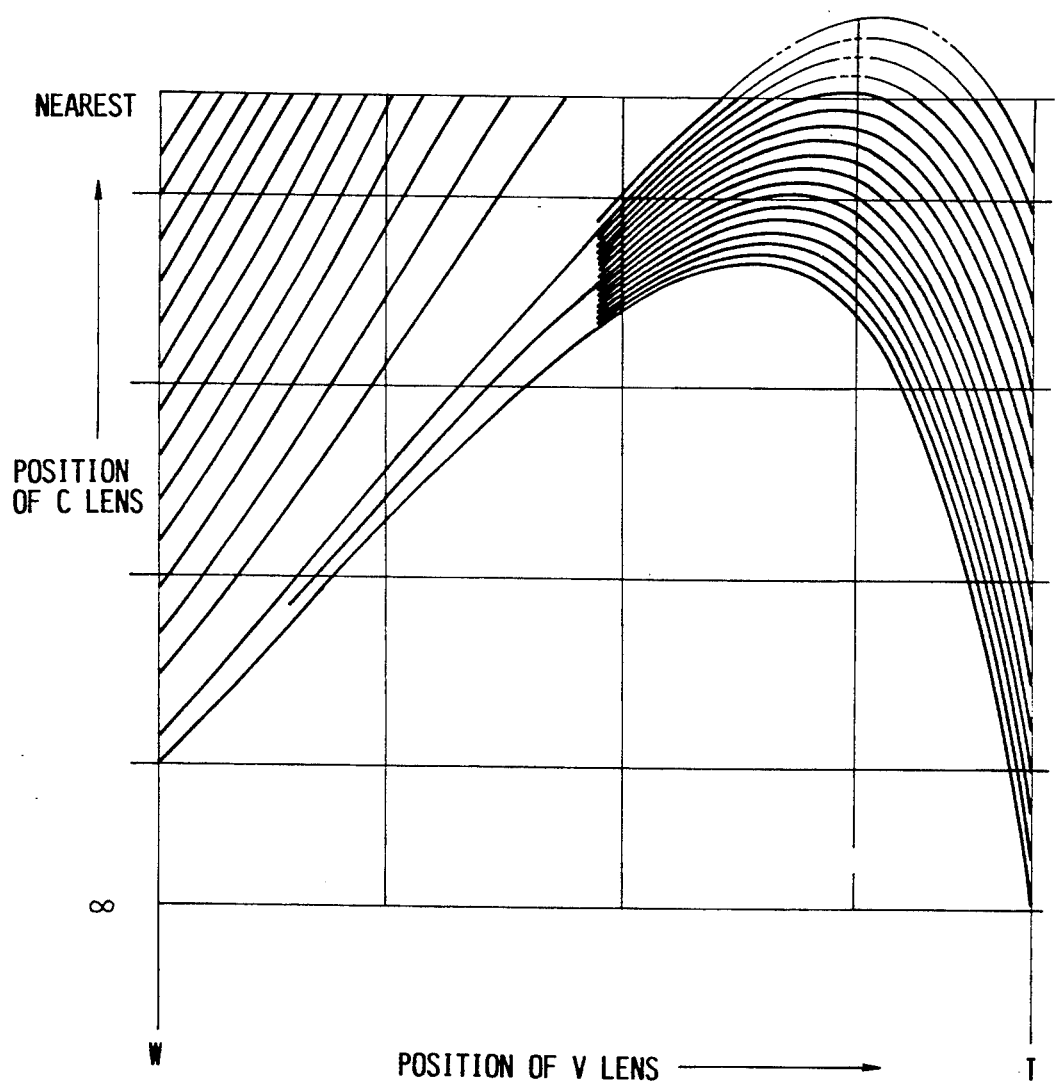
FIG. 2 is a graph showing V-C curves which represent a relation obtained between the V lens and the C lens within the lens arrangement shown in FIG. 1.
Figure 4:
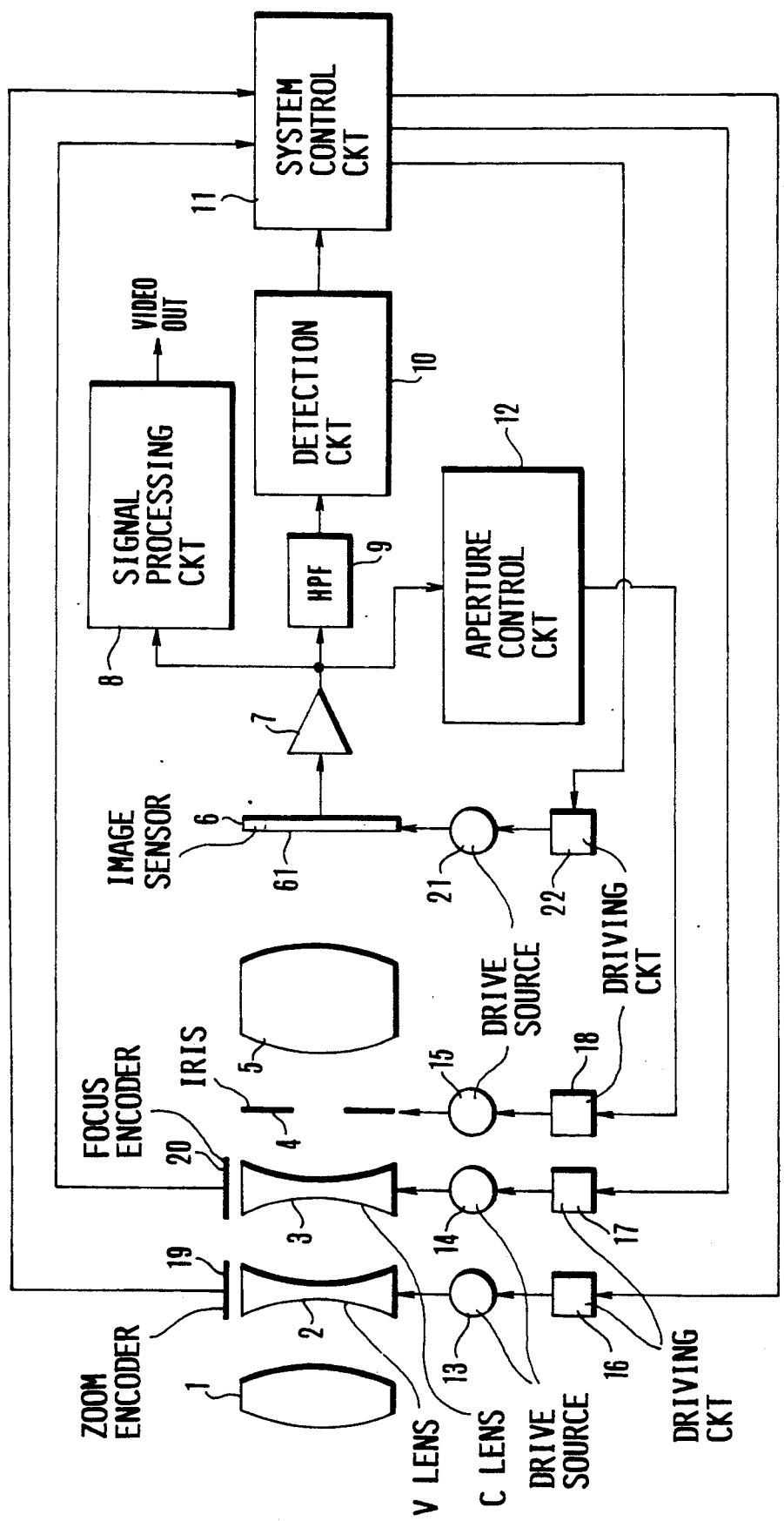
FIG. 4 is a block diagram showing a camera arranged as a first embodiment of this invention.

The following describes in detail the embodiments of this invention with reference to the drawings:

FIG. 4 is a block diagram showing a camera arranged as a first embodiment of the invention. In FIG. 4, the same component parts as those of the lens arrangement shown in FIG. 1 are indicated by the same reference numerals and the details of them are omitted from the description. An image sensor 6 is, for example, a CCD or the like and is arranged to produce an image signal by photo-electrically converting an image formed on the image sensing plane 61 thereof. A preamplifier 7 is arranged to amplify the image signal output from the image sensor 6 up to a given level. A signal processing circuit 8 is arranged to perform a signal processing action on the image signal output from the preamplifier 7 including a blanking process, a synchronizing signal adding process, a gamma correction process, etc., and thus to convert the image signal into a standardized TV signal. A high-pass filter (HPF) 9 is arranged to extract a high-frequency component from the image signal output from the preamplifier 7. A detection circuit 10 is arranged to detect the high-frequency component output from the HPF 9 and to supply the level thus detected to a system control circuit 11. The system control circuit 11 is composed of, for example, a microcomputer and is arranged to control the whole system of the camera. An aperture control circuit 12 is arranged to detect the output signal level of the preamplifier 7 and to produce a control signal for controlling an iris 4 in such a manner as to make the signal level constant. Drive sources 13, 14 and 15 are, for example, motors arranged to drive the V lens 2, the C lens 3 and the iris 4 respectively. Driving circuits 16, 17 and 18 are arranged to drive the drive sources 13, 14 and 15. A zoom encoder 19 and a focus encoder 20 are arranged to detect changes in the position of the V lens 2 and that of the C lens 3 and to convert the positional changes into electrical signals respectively. A drive source 21 is provided for an actuator such as a piezoelectric element or the like which is arranged to give information on the blurring direction of the image, a near-focus state and a far-focus state in cases where the lens is out of focus by shifting the position of the image sensor 6 to a very small extent in the optical axis direction. A driving circuit 22 is arranged to drive the drive source 21.

Figure 7:
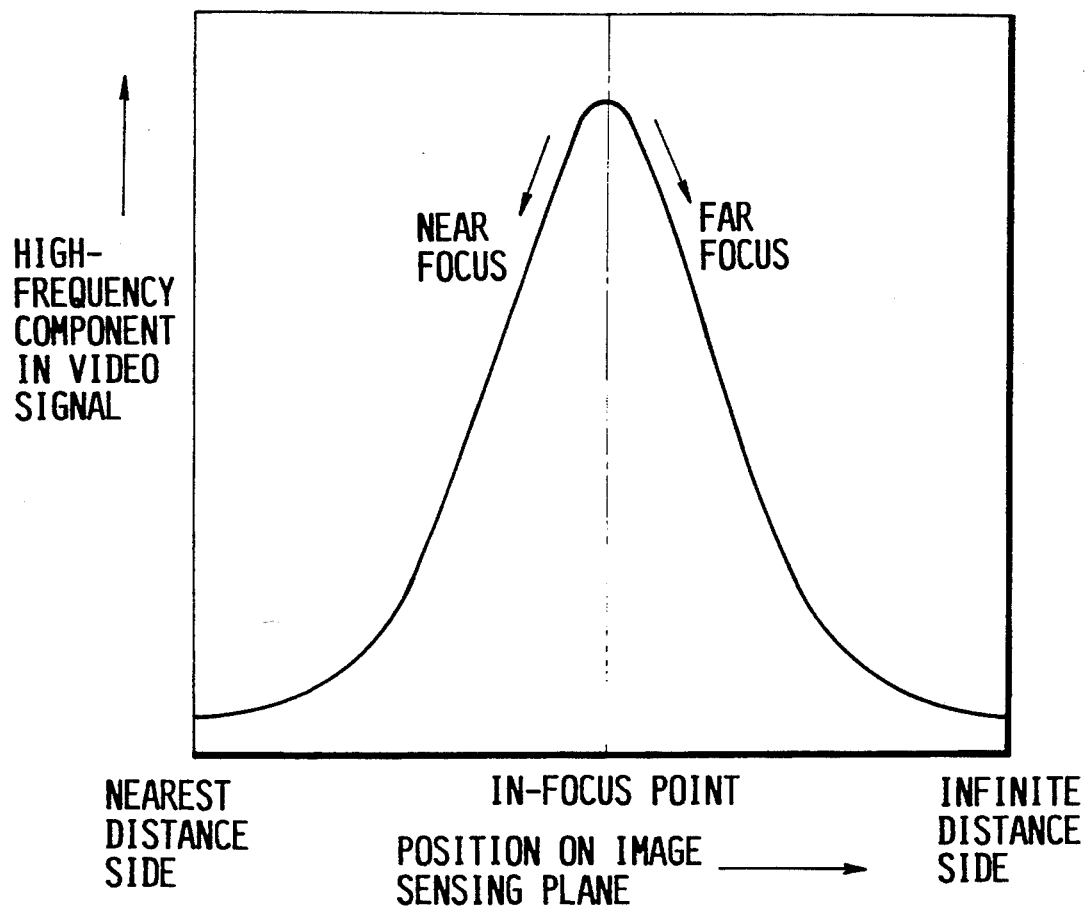
FIG. 7 is a graph showing in a characteristic curve the position of an image sensing plane in relation to the level of a high-frequency component included in a video signal.

The whole camera system shown in FIG. 4 is arranged to be controlled by the system control circuit 11. The automatic focusing action by which the embodiment of the invention is characterized is as described below:

The HPF 9 extracts only the high-frequency component that is necessary for determining an in-focus state from the image signal output from the preamplifier 7. The high-frequency component is processed by the detection circuit 10 before it is supplied to the system control circuit 11. The high-frequency component in the image or video signal is at its maximum level when the position of the focusing lens group is at an in-focus point as shown in FIG. 7. The level lowers accordingly as the position of the focusing lens group moves away from the in-focus point. The output signal of the HPF 9 is detected and converted into a DC level by the detection circuit 10. An automatic focusing action can be accomplished by shifting the C lens 3 jointly by the motor 14 and the driving circuit 17 to a point at which the DC level reaches the maximum value thereof.

In performing the automatic focusing action, it is necessary to find the direction in which the C lens is to be moved, i.e., toward the infinite distance end or toward the nearest distance end. In other words, the current blurred state must be determined as to whether it is a near-focus state or a far-focus state.

The system control circuit 11 makes a discrimination between the two blurring directions by shifting the image sensor 6 or the image sensing plane 61 thereof by using an actuator such as a piezoelectric element or the like in conjunction with the drive source 21 and the driving circuit 22 to a given very small extent and by finding a change occurring in the detection level of the high-frequency component. The lens can be determined as in a far-focus state if the level of the high-frequency component of the video signal is increasing and as in a near-focus state if the level of the high-frequency component is decreasing with the image sensing plane 61 moved in the direction in which an in-focus state is obtained for an object located nearer than in the current position.

The degree of focus is thus detectable on the basis of information on a near- or far-focus state in relation to the in-focus point and the level of the high-frequency component.

Figure 5:
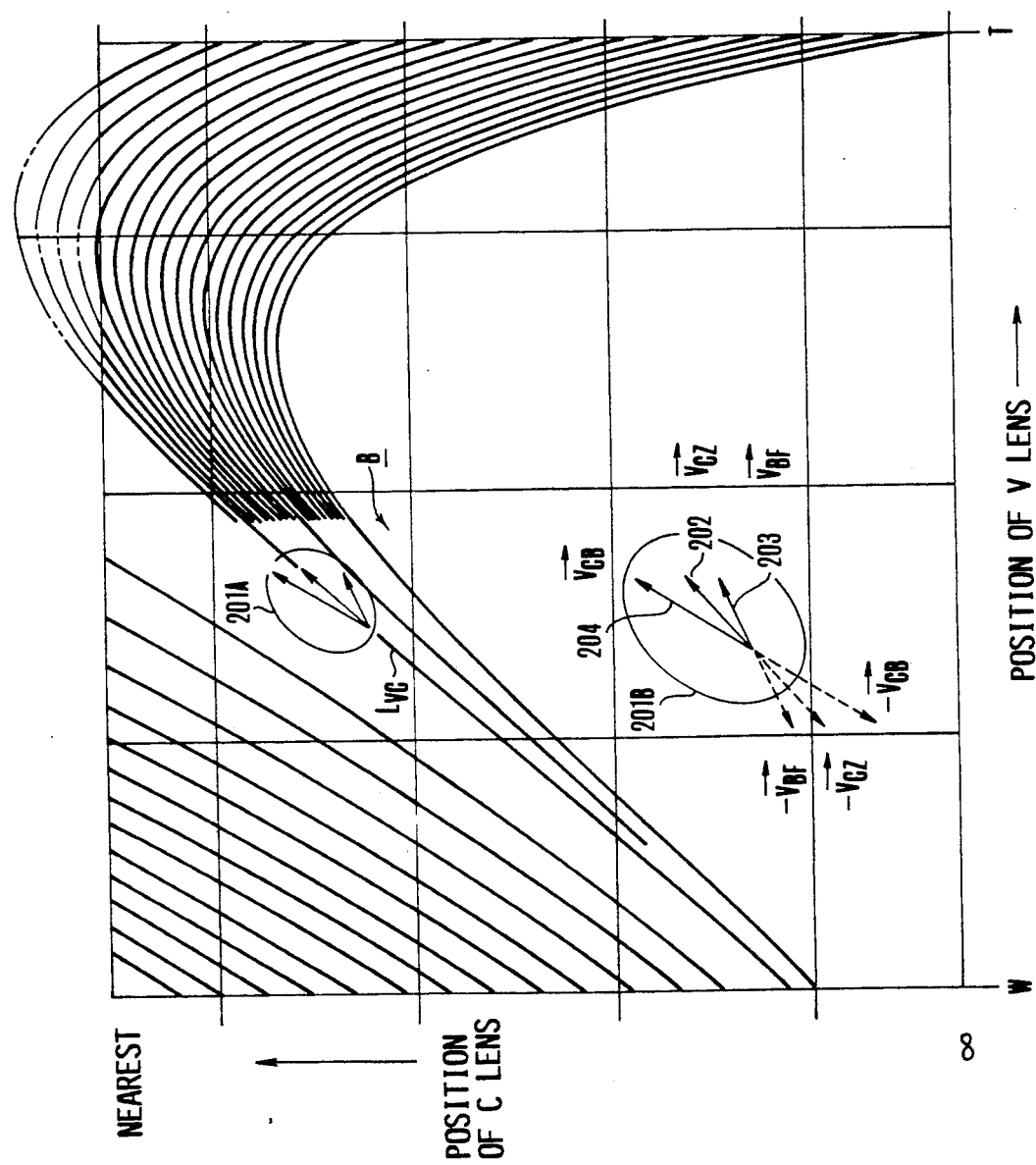
FIG. 5 shows V-C characteristic curves representing the shifting characteristic of the V and C lenses for the purpose of illustrating the control action of the first embodiment of the invention.

With the camera arranged according to the invention in a manner as described above, the system control circuit 11 corrects the defocus state of the C lens 3 which takes place when the V lens 2 is moved by a zooming action. The defocus correcting action on the C lens is performed on an operating principle which is as described below with reference to FIG. 5:

FIG. 5 shows V-C curves. The V lens 2 and the C lens 3 are shifted and controlled by and large according to the curves applicable to their positions. Each of the V-C curves is divided into a plurality of blocks for the different positions of each lens.

Figure 3:
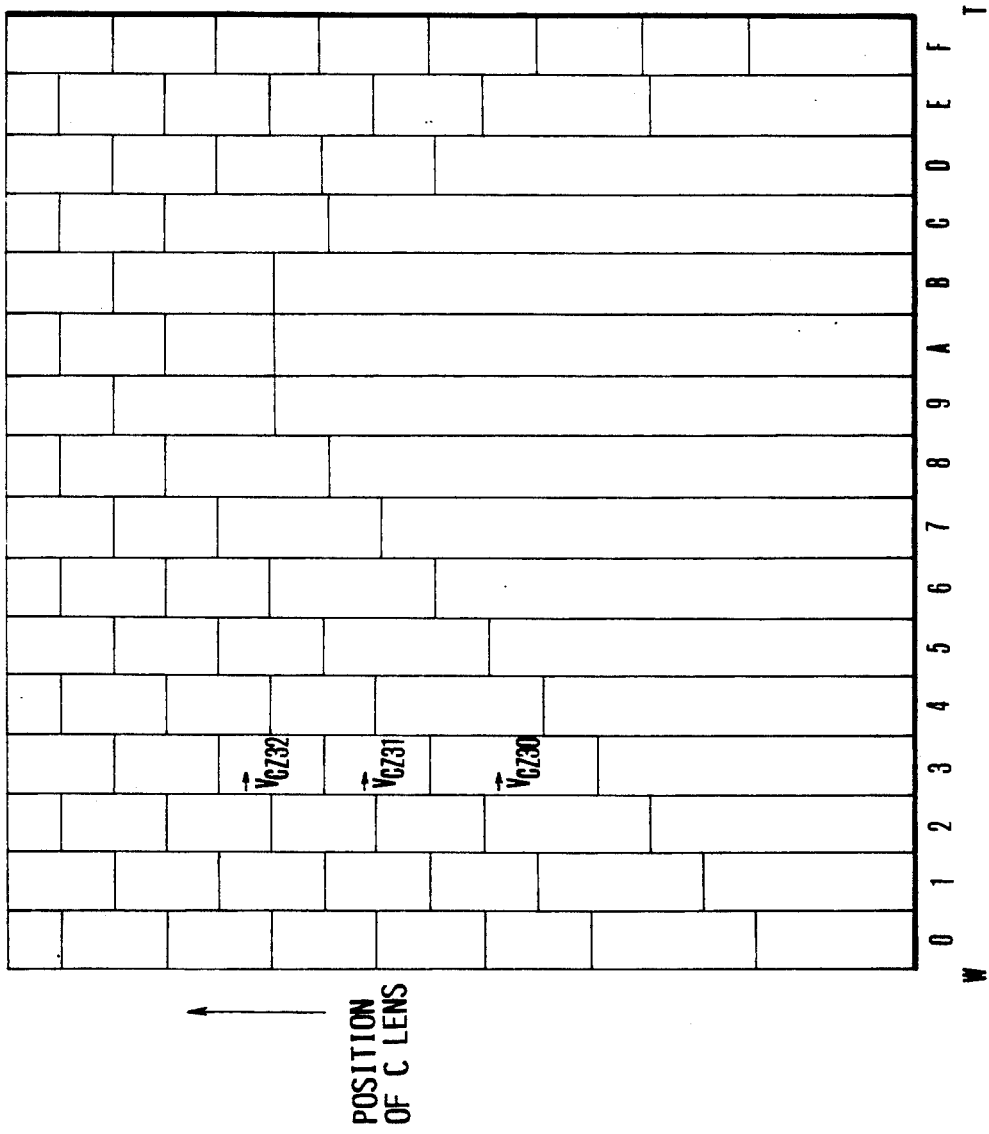
FIG. 3 shows a plurality of blocks obtained by dividing the V-C curves of FIG. 2 for the purpose of detecting the shifting areas of V and C lenses.

Within each block, there are stored three different C lens shifting speeds $\vec{V}_{CZ}$, $\vec{V}_{BF}$ and $\vec{V}_{CB}$ corresponding to the zooming action. In the case of this embodiment, the direction in which the zooming action is performed from the wide-angle end side W to the telephoto end side T is designated for the three speeds. The speed $\vec{V}_{CZ}$ is the representative speed for each of the blocks as shown in FIG. 3. Other speeds $\vec{V}_{BF}$ and $\vec{V}_{CB}$ are arranged as follows:

At a part 201A of FIG. 5, a block B is shown by way of example. The V lens 2 and the C lens 3 are assumed to be shifted along a V-C curve $L_{VC}$ within this part. A part 201B shows the part 201A in an enlarged state. Referring to the part 201B, each arrow mark indicates the speed at which the C lens 3 follows the V lens 2 along the V-C curve when the V lens 2 moves in the direction from the end W to the other end T (hereinafter referred to as W→T direction). The arrow 202 indicates a standard speed $\vec{V}_{CZ}$, the arrow 203 a speed $\vec{V}_{BF}$ at which the C lens 3 is shifted always on the far-focus side of the shift at the standard speed $\vec{V}_{CZ}$, and another arrow 204 a speed $\vec{V}_{CB}$ at which the C lens 3 is shifted always on the near-focus side of the shift at the standard speed $\vec{V}_{CZ}$.

Figure 6:
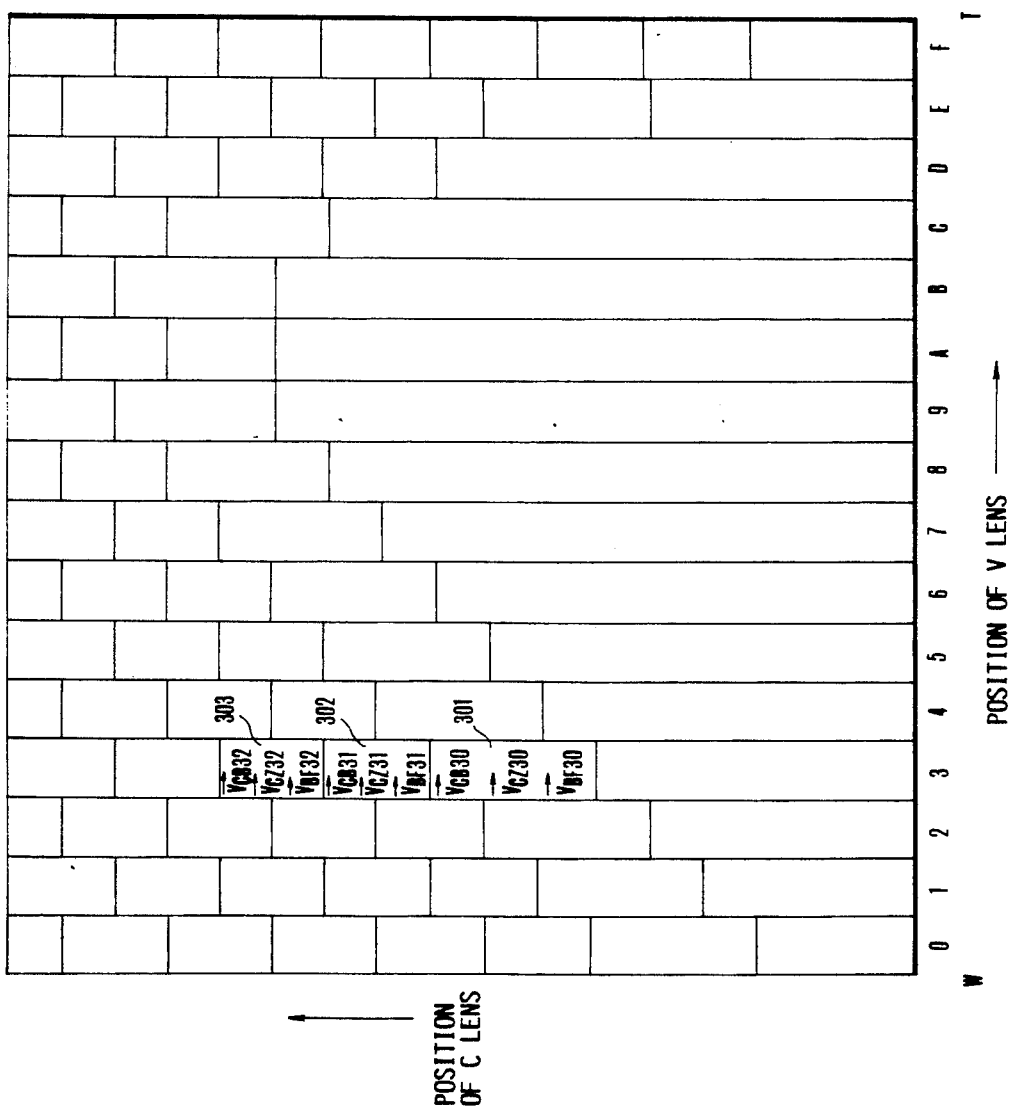
FIG. 6 shows a plurality of blocks obtained by dividing the V-C curves for the purpose of detecting the shifting areas of the V and C lenses of the first embodiment.

These speeds $\vec{V}_{BF}$ and $\vec{V}_{CB}$ are set for all the speeds $\vec{V}_{CZ}$. As shown in FIG. 6, the whole V and C lens shifting range which is represented by the V-C curves is divided into a plurality of blocks. The three speeds are set for every one of the plurality of blocks. These speeds are stored in a memory beforehand within the system control circuit 11. One of the stored speeds is selected according to the operating state of the lens system and the C lens 3 is controlled accordingly.

As shown in FIG. 6, the speeds $\vec{V}_{CZ}$, $\vec{V}_{BF}$ and $\vec{V}_{CB}$ are set in each of blocks 301, 302 and 303. The suffixes of them represent addresses indicating the shifting areas 0 to F of the V lens 2 and the shifting areas 0 to 7 of the C lens 3. The blocks for which they are set can be designated by these suffixes.

The above description applies to a case where the zooming action is to be performed in the W→T direction. The speed $\vec{V}_{CZ}$ is the standard speed of the C lens 3 for the zooming action to be performed in the direction from W (wide-angle end) to T (telephoto end). The speed $\vec{V}_{BF}$ is the far-focus driving speed of the C lens 3 (a speed for correcting a near-focus state of the C lens 3 by shifting it toward a far-focus state) for the zooming action. The speed $\vec{V}_{CB}$ is the near-focus driving speed of the C lens 3 (a speed for correcting a far-focus state of the C lens 3 by shifting it toward a near-focus state) for the zooming action. Therefore, as apparent from FIG. 5, the speed of the C lens 3 at $\vec{V}_{CB}$ is faster than at $\vec{V}_{CZ}$, and its speed at $\vec{V}_{BF}$ is lower than at $\vec{V}_{CZ}$. At the part 201A of FIG. 5, the C lens 3 is shifting upward at all the speeds as viewed in the drawing.

A zooming action performed in the direction from the telephoto end side T to the wide-angle end side W (hereinafter referred to as T→W direction) is described as follows: For the sake of simplification, reference is made to the part 201A of FIG. 5. In order to accurately trace the V-C curve, the C lens 3 must be driven at a speed $-\vec{V}_{CZ}$ which is indicated by a broken line and which is the inverse of the standard speed $\vec{V}_{CZ}$ which is indicated by the arrow 202. In this case, the C lens 3 is shifted downward as viewed in FIG. 5.

As a consequence, the direction of the C lens correcting speeds $\vec{V}_{BF}$ and $\vec{V}_{CB}$ must also be changed. However, if the speed $\vec{V}_{BF}$ is merely replaced with a speed $-\vec{V}_{BF}$ and the speed $\vec{V}_{CB}$ with a speed $-\vec{V}_{CB}$, the speed $-\vec{V}_{BF}$ would become the correcting speed toward a near-focus state and the other speed $-\vec{V}_{CB}$ the correcting speed toward a far-focus state in the case of the zooming action in the T→W direction. This causes the following inconvenience:

The focus detecting means mentioned in the foregoing includes blurring direction detecting means. The blurring direction detecting means produces information on the blurring direction (information on a near- or far-focus state) irrespectively of the direction in which the zooming action is performed. Therefore, in the case of the zooming action in the T→W direction, if the C lens driving speed $-\vec{V}_{CB}$ is used for correcting the far-focus state of the C lens 3 and the speed $-\vec{V}_{BF}$ for correcting the near-focus state of the C lens 3 in the same manner as in the case of the zooming action in the W→T direction, the blurred state not only cannot be corrected but would come to increase.

Therefore, in the case of the zooming action in the T→W direction, the C lens driving speed is not merely inverted. In this case, the speed $-\vec{V}_{BF}$ is employed as a far-focus correction speed if the blurring direction is found to be on the far-focus side; the speed $-\vec{V}_{CB}$ as a near-focus correction speed if the blurring direction is found to be on the near-focus side; and the speed $-\vec{V}_{CZ}$ as the C lens driving speed in the case of an in-focus state.

While the above describes the part 201A, the relation of these speeds $\vec{V}_{CZ}$, $\vec{V}_{BF}$ and $\vec{V}_{CB}$ to the inverted speeds $-\vec{V}_{CZ}$, $-\vec{V}_{BF}$ and $-\vec{V}_{CB}$ remains the same for every one of the blocks on the V-C curves shown in FIG. 5. Therefore, the blur correction can be accurately accomplished during the process of a zooming action by suitably selecting one of these speeds according to the direction of the zooming action. In FIG. 5, the speeds $-\vec{V}_{CZ}$, $-\vec{V}_{BF}$ and $-\vec{V}_{CB}$ are indicated by broken lines.

Further, if the memory provided within the system control circuit 11 for storing the speed data for each block of the V-C curves has an ample storage capacity, it is possible to have the three different C lens driving speeds for the zooming action in the T→W direction also separately defined and stored in the memory.

Figure 8:
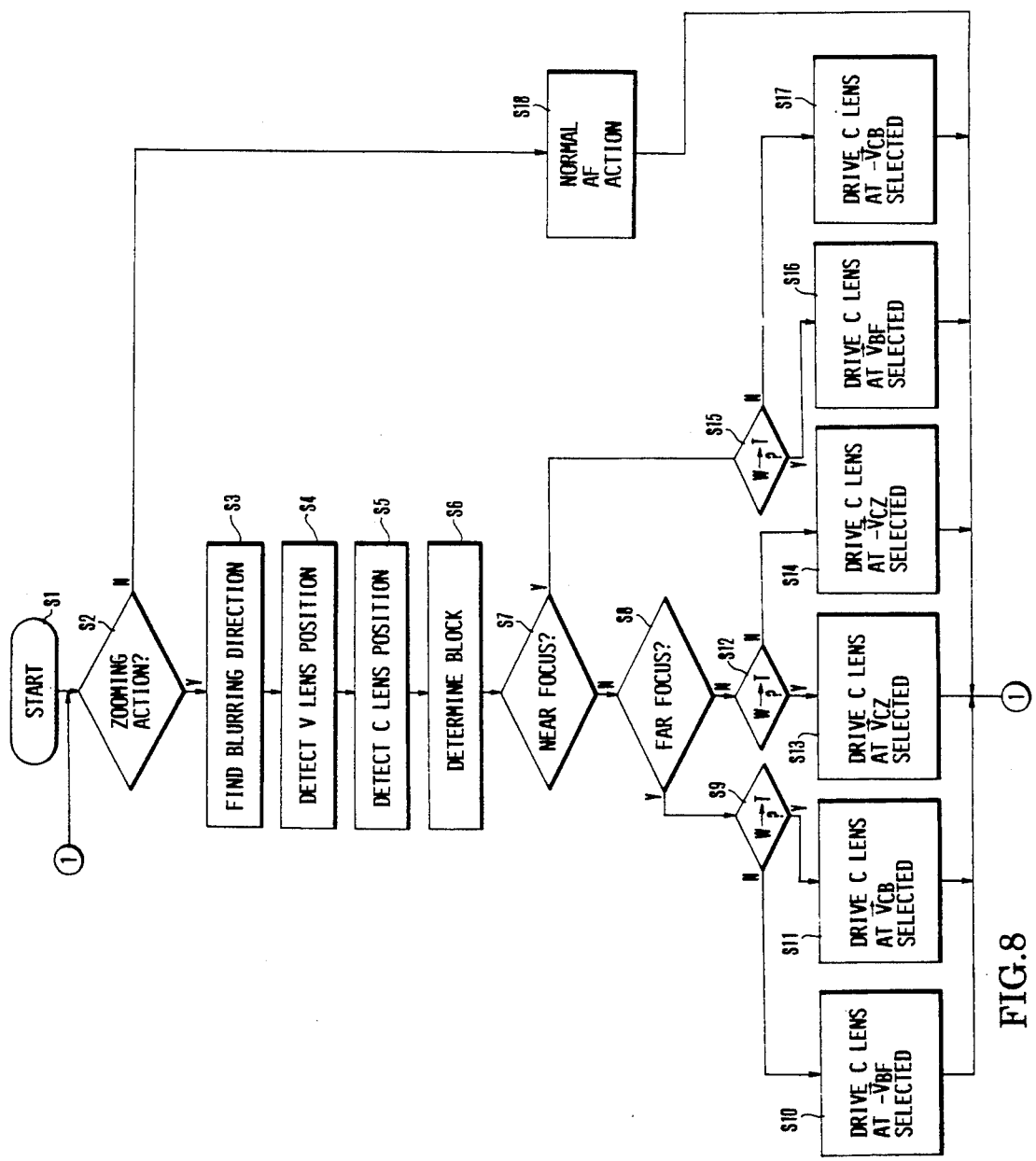
FIG. 8 is a flow chart showing the control action of the first embodiment.

Next, an actual control operation of the camera according to this invention is described below with reference to FIG. 8 which is a control flow chart:

Referring to FIG. 8, the camera begins to operate at a step S1. At a step S2: A check is made for a zooming action. If no zooming action is found to be performed, the flow of the control operation comes to a step S18 for a normal AF (automatic focusing) action. With no zooming action performed, the V lens 2 is in repose. Therefore, the optical system of the camera can be accurately focused by driving the C lens 3 according to the degree of blur.

If a zooming action is found to be performed at the step S2, the flow comes to a step S3 to find the blurring direction. In finding the blurring direction, the image sensor 6 is moved to a very small extent in the direction of the optical axis and a change taking place in the degree of focus, i.e., a change in the output level of the detection circuit 10, is detected as mentioned in the foregoing. At a step S4: The position of the V lens 2 is detected through the output of the zoom encoder 19. At a step S5: The position of the C lens 3 is detected through the output of the focus encoder 20. At a step S6: A block where the lens position is currently located on the V-C curve as shown in FIG. 6 is determined on the basis of the positional information of the V lens 2 and the C lens 3.

At a step S7: A check is made for the current position of the C lens 3 to find if it is at a near-focus point. If so, the flow comes to a step S15 to find in which direction the zooming lens is being driven. At the step S15: If the zooming action is found to be in the W→T direction, the C lens driving speed is set at the near-focus correcting speed $\vec{V}_{BF}$ which is slower than the above-stated standard speed $\vec{V}_{CZ}$. This causes the C lens 3 to be driven and shifted at the near-focus correcting speed $\vec{V}_{BF}$ in each of the blocks while it moves stepwise along the V-C curve. As a result, an in-focus point for the object image obtained through the fourth lens group 5 is shifted for correction from the near-focus point toward a far-focus point relative to the position of the image sensing plane 61. As shown by a characteristic curve of FIG. 7, the focusing state of this action is such that the correcting step proceeds from a near-focus point on the left side of an in-focus point to a peak value in a hill climbing manner.

If the zooming action is found to be performed in the T→W direction instead of in the W→T direction at the step S15, it means that the blurring direction is on the near-focus side. Therefore, the C lens driving speed is set at the speed $-\vec{V}_{CB}$ which is slower than the speed $-\vec{V}_{CZ}$ for adjustment to an in-focus point and the control is performed to accurately trace the V-C curve.

With this action continuously performed during the zooming action, correction is made at an early stage when an out-of-focus state is detected, so that the V-C curve can be accurately traced.

Next, in a case where the lens position is found to be not at a near-focus point at the step S7, the control is performed as follows: In this case, the flow proceeds to a step S8. At the step S8: A check is made to see if the lens position is at a far-focus point. If not, it indicates no blurred state. The lens is, therefore, considered to be in focus. With the in-focus state thus attained, it indicates that the C lens 3 is shifted accurately while tracing the V-C curve in relation to the movement of the V lens 2 under the zooming action. Therefore, the flow comes to a step S12. At the step S12: A check is made to find if the zooming action is in the W→T direction. If so, the flow comes to a step S13. At the step S13: The standard speed $\vec{V}_{CZ}$ for the zooming action is selected. The C lens 3 is then driven at this speed.

If the zooming action is found at the step S12 to be in the T→W direction instead of the W→T direction, the flow comes to a step S14. At the step S14: The standard speed $-\vec{V}_{CZ}$ is selected for the zooming action. The C lens is then driving at that speed.

Meanwhile, if the blurring direction is found to be on the side of far focus, the flow comes to a step S9. At the step S9: a check is make to find if the zooming action is in the W→T direction. If so, the flow comes to a step S11. At the step S11: The C lens is driven at the far-focus correcting speed $\vec{V}_{CB}$ in the direction of the zooming action. If the zooming action is found at the step S9 to be in the T→W direction instead of the W→T direction, the flow comes to a step S10. At the step S10: The C lens is driven at the far-focus correcting speed $-\vec{V}_{BF}$ in the direction of the zooming action.

This causes the C lens 3 to be gradually shifted from the far-focus side of the V-C curve toward the near-focus side thereof until it reaches the V-C curve to accurately trace this curve. Considering this in respect of the state of focus, the lens position comes to climb the hill-shaped characteristic curve of FIG. 7, representing the level of the high-frequency component, from the right side, i.e., the far-focus side, of the in-focus point until it reaches the in-focus point. With the above-stated flow of control operation repeatedly executed, the zooming action can be accomplished by accurately tracing the V-C curve without bringing about any blurred state.

While the above describes each of the speeds set for the part 201A of the V-C curve of FIG. 5, the speeds $\vec{V}_{CZ}(-\vec{V}_{CZ})$, $\vec{V}_{BF}(-\vec{V}_{BF})$ and $\vec{V}_{CB}(-\vec{V}_{CB})$ are set also for every one of the blocks shown in FIG. 6. One of these speeds is selected according to the block at which the lens position is located.

Figure 9:
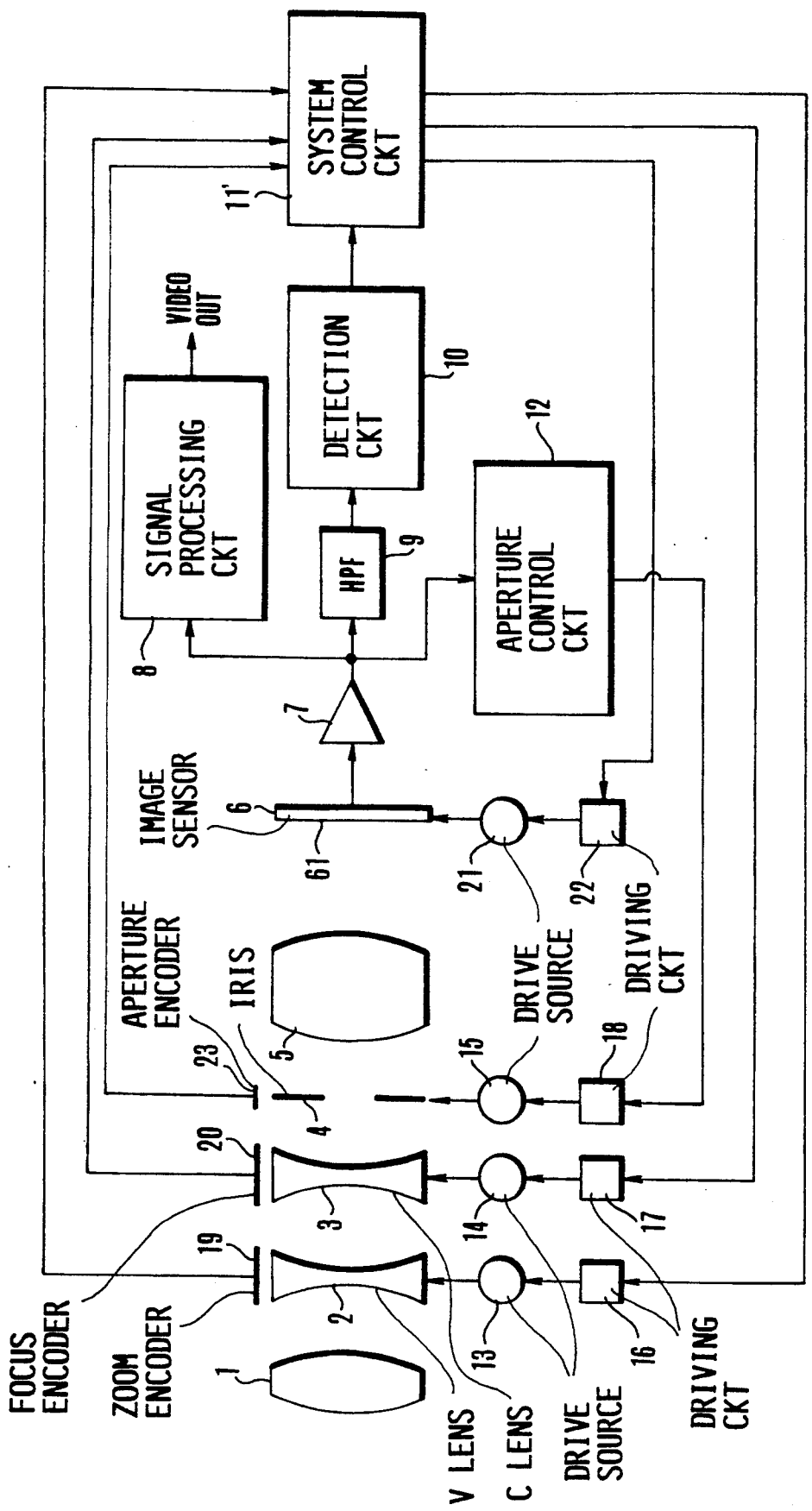
FIG. 9 is a block diagram showing a camera which is arranged as a second embodiment of the invention.

FIG. 9 shows in a block diagram a second embodiment of this invention. The same component parts as those of the first embodiment shown in FIG. 4 are indicated by the same reference numerals and the details of them are omitted from the following description. The second embodiment differs from the first embodiment in the following point: An aperture encoder 23 is arranged to detect an aperture value. The aperture value thus detected is supplied to a system control circuit 11' to be used for controlling the speed of the C lens 3 for focusing.

In the case of the first embodiment described in the foregoing, the C lens driving speeds $\vec{V}_{BF}$ and $\vec{V}_{CB}$ for each of the blocks shown in FIG. 6 are set in relation to the standard C lens driving speed $\vec{V}_{CZ}$ for the block in such a way as to be used in shifting the C lens 3 toward the far-focus side and the near-focus side.

The position correcting action on the C lens 3 during a zooming action must be performed in the same manner for every part of the V-C curve shown in FIG. 5, i.e., for every one of the blocks shown in FIG. 6. It is desirable for this purpose to numerically define the degree of correction for the control action of the system control circuit 11'. For example, the changing degree δ of a circle of confusion obtained per unit time on the image sensing plane 61 when the V lens 2 moves can be used as the correcting degree. This is more specifically stated below:

In the case of a zoom lens system of the kind arranged as shown in FIGS. 4 and 9, the positional sensitivity of the C lens 3 which is a focusing lens remains approximately unchanged irrespectively of the focal length. Therefore, the shifting degree of the position of the focal point for the shifting degree of the C lens 3 is little affected by a zooming action. Therefore, the changing degree δ of the circle of confusion appearing on the image sensing plane as a result of the movement of the C lens can be defined solely by the shifting degree X of the in-focus position relative to the aperture value F No and the moving degree of the C lens 3 and thus can be expressed as follows:

$$\delta = X/F\,No \quad (1)$$

Figure 10:
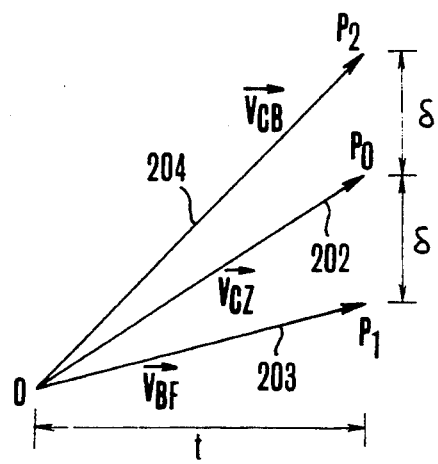
FIG. 10 shows the operation of the second embodiment.

FIG. 10 shows the three different speeds $\vec{V}_{CZ}$, $\vec{V}_{BF}$ and $\vec{V}_{CB}$ shown in FIG. 5 with the changing degree of the circle of confusion taken into consideration. In FIG. 10, $\overline{OP0}$ indicates a change occurring when the C lens is moved for a period of time t along the V-C curve of FIG. 5. Therefore, a point P0 represents a point where the lens is in focus for an object distance. $\overline{OP2}$ indicates a displacement required for coming to a point blurring as much as δ in terms of the changing degree of the circle of confusion on the near-focus side of the point P0 during the period of time t. Further, $\overline{OP1}$ indicates a displacement required for coming to a point blurring as much as δ on the far-focus side.

With $\overline{OP0}$, $\overline{OP1}$ and $\overline{OP2}$ substituted as they are for the speeds $\vec{V}_{CZ}$, $\vec{V}_{BF}$ and $\vec{V}_{CB}$, the speed $\vec{V}_{BF}$ can be regarded as a speed for correction toward the far-focus side as much as the changing degree δ of the circle of confusion during the period of time t; and the speed $\vec{V}_{CB}$ as a speed for correction toward the near-focus side as much as δ during the period of time t.

The changing degree δ is determined solely by the shifting degree X of the in-focus point position if the aperture value F No remains unchanged as shown in Formula (1). Further, since the shifting degree X is determined by the shifting degree of the C lens 3, the changing degree δ of the circle of confusion obtained with the aperture value F No unchanged is determined solely by the shifting degree of the C lens 3.

Therefore, as mentioned at the beginning of description of this embodiment, in order to keep the value of correcting degree δ unchanged despite of a change in the state of the lens system, the C lens shifting degree is increased in proportion to the increase of the aperture value F No according to Formula (1). Assuming that the shifting degree of the C lens 3 is m for making correction as much as δ when the aperture value F No is 1.0, the near-focus correcting degree is obtained by shifting the C lens 3 on the near-focus side and the far-focus correction degree δ is obtained by shifting the C lens 3 on the far-focus side as much as m as compared with the C lens shifting degree for the speed $\vec{V}_{CZ}$. Further, in a case where the aperture value F No is 2.0, the C lens correcting shifting degree which is m when the aperture value F No is 1.0 becomes 2 m.

Figure 11:
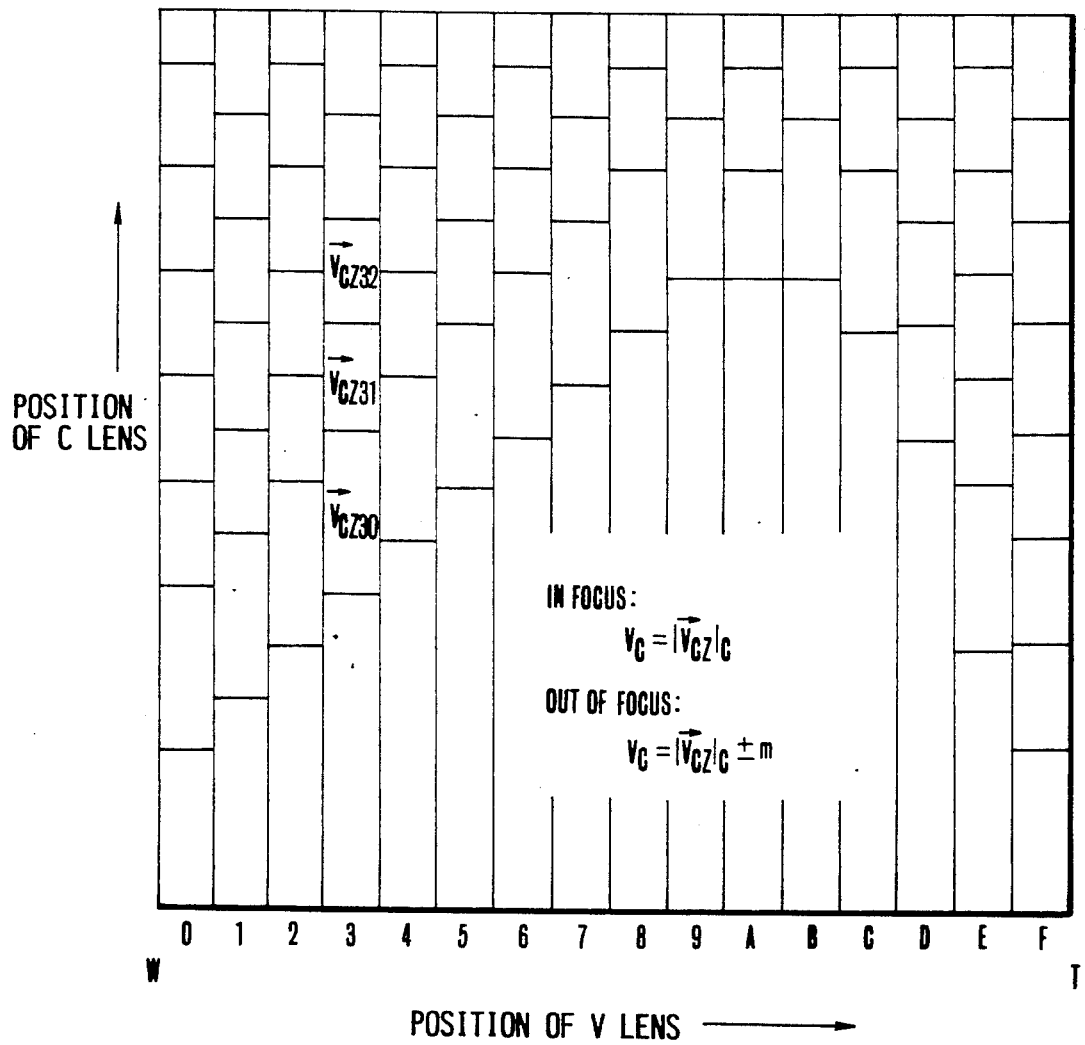
FIG. 11 shows a plurality of divided blocks obtained for the purpose of detecting the shifting areas of V and C lenses during the control action of the second embodiment.

The aperture value F No of the iris 4 is, therefore, divided into a number of areas as shown in FIG. 13. To these areas are assigned C lens shifting degrees M0, M1, M2, M3, ---. The focus is corrected by the value m suited for each aperture value during a zooming action, so that a given degree of correction is obtainable when the aperture changes. Then, with the V-C curve divided into a plurality of blocks, it is only the speed $\vec{V}_{CZ}$ that is required to be stored for each of these blocks as shown in FIG. 11. This permits reduction in the storage area.

Figure 12:
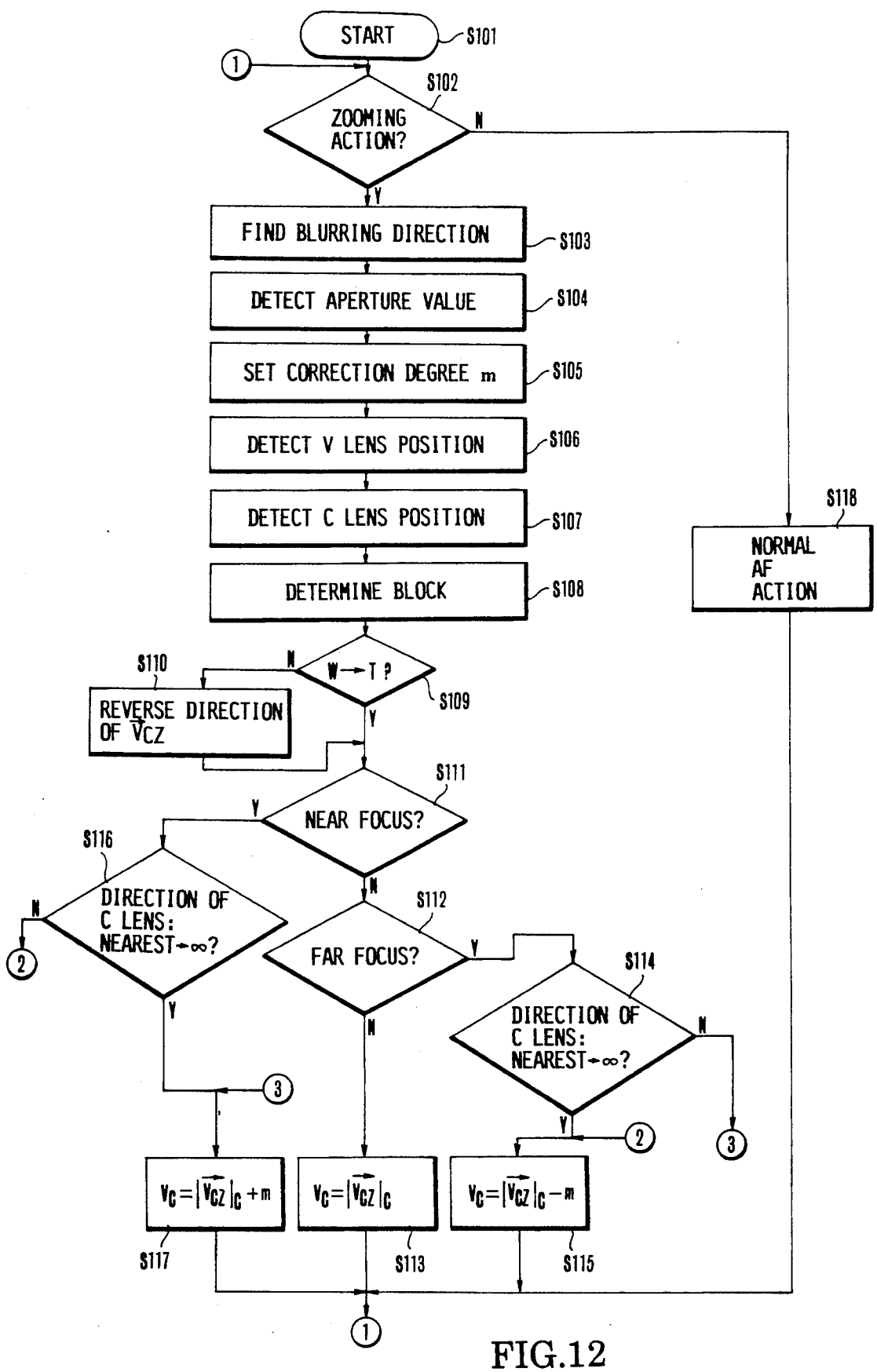
FIG. 12 is a flow chart showing the control action of the second embodiment.

FIG. 12 is a flow chart showing a control program which is stored within the system control circuit 11' to be executed by the second embodiment described above.

Referring to FIG. 12, the camera begins to operate at a step S101. At a step S102: A check is made to find if a zooming action is performed. If not, the flow of control comes to a step S 118. At the step S 118: A normal AF action is performed. With no zooming action performed, the V lens 2 is in repose. Therefore, an in-focus state is accurately attainable by driving the C lens 3 according to the degree of blur.

If a zooming action is found to be performed at the step S102, the flow proceeds to a step S103. At the step S103: The blurring direction is determined. The blurring direction can be found, as mentioned in the foregoing, by moving the image sensor 6 to a very small extent in the direction of the optical axis; by detecting a change taking place in the output level o±the detection circuit 10 which indicates the degree of focus; and by making a discrimination between a near-focus state and a far-focus state on the basis of the change in the output level.

At a step S104: The aperture value F No is detected from the output of the aperture encoder 23. The aperture value thus detected is supplied to the system control circuit 11'. At a step S105: A correction degree m is set according to the aperture value as mentioned in the foregoing. At a step S106: The position of the V lens 2 is detected from the output of the zoom encoder 19. At a step S107: The position of the C lens 3 is detected from the output of the focus encoder 20. At a step S108: One of the blocks at which the lens is located is determined on the basis of information on these lens positions.

At a step S109: A check is made for the direction of the zooming action. If the zooming action is found to be performed in the W→T direction, the C lens 3 is shifted at the standard driving speed $\vec{V}_{CZ}$. If the zooming action is found to be in the T→W direction, the flow comes to a step S110 to invert the standard C lens driving speed $\vec{V}_{CZ}$ into the inverse speed $-\vec{V}_{CZ}$. At a step S111: The output of focus detection means is checked for the blurring direction. In other words, a discrimination is made between a near-focus state and a far-focus state. If it is found to be a near-focus state, the flow comes to a step S116. At the step S116: A check is made for the current shifting direction of the C lens 3. If the C lens 3 is found to be shifting from a nearest distance position toward an infinite distance position, the flow comes to a step S117. At the Step S117: The C lens driving speed is set at a speed $V_C \,(= |\vec{V}_{CZ}|C + m)$ which is obtained by adding the correction degree m to the magnitude or the absolute value $|\vec{V}_{CZ}|C$ of the speed $\vec{V}_{CZ}$. In other words, the speed of the C lens 3 in the nearest-to-infinite direction is increased, so that the lens can be shifted to an in-focus point by promptly removing the blur in the near-focus direction.

In a case where the C lens shifting direction is found not in the nearest-to-infinite direction at the step S116, the flow comes to a step S115. At the step S115: The C lens 3 is driven at a decelerated speed $(= |\vec{V}_{CZ}|C - m)$ which is obtained by subtracting the correction degree m from the absolute value $|\vec{V}_{CZ}|C$ of the speed $\vec{V}_{CZ}$. The C lens driving speed in the direction from the infinite distance position toward the nearest distance position is thus lowered in correcting the blur in the near-focus direction. The C lens 3 is thus driven to an in-focus point.

By this, the C lens 3 is driven while tracing the V-C curve. Therefore, the zooming action is performed without causing any blur.

If the lens is found to be not in a near-focus state at the step S111, the flow proceeds to a step S112. At the step S112: A check is made for a far-focus state. If the lens is found not in a near-focus state nor in a far-focus state, thus indicating an in-focus state, the C lens 3 is driven along the V-C curve. The flow then comes to a step S113. At the step S113: The C lens 3 is driven at a speed $V_C = |\vec{V}_{CZ}| C$ which is obtained from the standard driving speed $\vec{V}_{CZ}$ without changing it.

If the lens is found to be in a far-focus state at the step S112, the flow comes to a step S114. At the step S114: A check is made for the shifting direction of the C lens 3. If the C lens shifting direction is found to be from the nearest distance end side toward the infinite distance end side, the C lens 3 is driven in the direction of increasing a blurred state. The flow then comes to the step S115 to correct a blurred state in the far-focus direction by decelerating the C lens driving speed with the correction degree m subtracted from the C lens driving speed $\vec{V}_{CZ}$.

Further, if the C lens shifting direction is found to be from the infinite distance side toward the nearest distance side at the step S114, the flow comes to a step S117. At the step S117: The correction degree m is added to the absolute value $|\vec{V}_{CZ}| C$ of the C lens driving speed $\vec{V}_{CZ}$ to accelerate it, so that the C lens 3 can be shifted to an in-focus point by promptly correcting a blurred state.

The V lens 2 and the C lens 3 can be driven while accurately tracing the V-C curve by repeating the above-stated flow of control. Therefore, the zooming action can be performed without causing any blur. In accordance with the arrangement described, the lens driving speed correcting degree is defined for correcting a blurred state through the changing degree per unit time of the circle of confusion. The near-focus correcting speed and the far-focus correcting speed are respectively set in relation to the standard driving speed. Since the changing degree of the circle of confusion varies with the aperture value (because of a change in sensitivity), the correcting speed is arranged to be constant by correcting the changing degree according to the aperture value. Therefore, a blurred state can be corrected in such a way as to make the change of the circle of confusion constant, so that the zooming action can be performed in a natural manner. Further, the speed data to be stored for each block of the V-C curve can be limited to the standard C lens driving speed as shown in FIG. 11.

Next, a third embodiment of this invention is described as follows:

The foregoing description of the first and second embodiments has given typical examples of specific means for correcting, according to this invention, the defocus state taking place during the process of a zooming action. These embodiments are capable of coping with changes taking place in the object distance and the focus during the zooming action. However, in cases where the blurring degree is greatly increased by an excessive change in the object distance during the process of the zooming action, the focusing accuracy sometimes lowers to require a longer time before an in-focus state is attained.

In view of this, the third embodiment is arranged to be not only capable of correcting a blur resulting from a zooming action but also capable of shortening the length of time required before attaining an in-focus state in the event of the great increase in the blurring degree.

While the basic arrangement of the third embodiment is similar to the arrangement shown in the block diagram of FIG. 4, the third embodiment differs from other embodiments in the control algorithm provided within the system control circuit.

Figure 14:
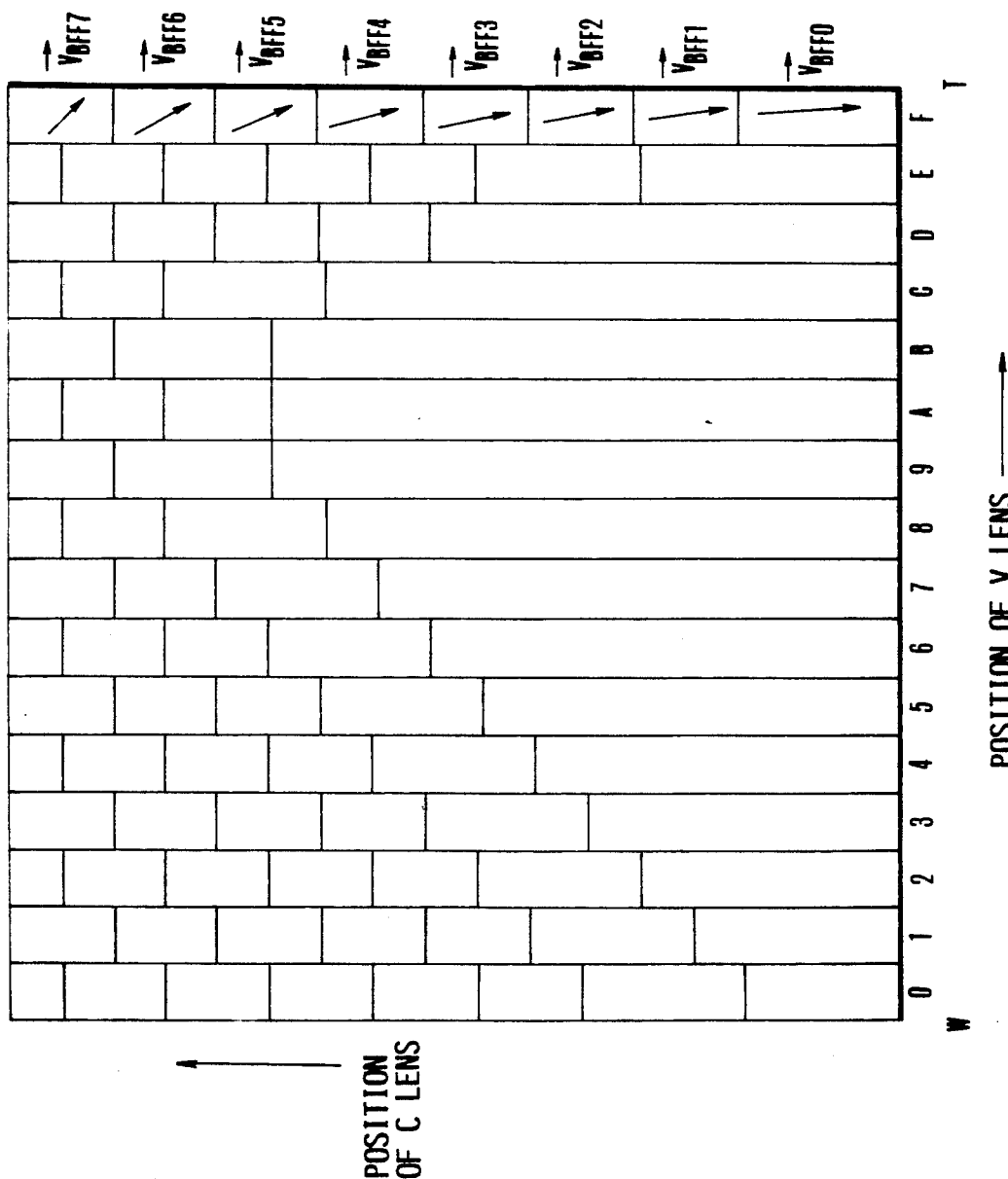
FIG. 14 shows a plurality of divided blocks obtained for the purpose of detecting the shifting areas of V and C lenses in the control action of a third embodiment of the invention.

FIG. 14 shows the V-C curve which indicates the shifting range of the V lens 2 and that of the C lens 3. The V-C curve is divided into a plurality of blocks covering every one of the shifting areas. More specifically, the shifting range of the V lens 2 is divided into 16 areas from 0 to F (hexadecimal digit). The shifting range of the C lens 3 is divided into 8 areas from 0 to 7 in the V lens shifting area F at the telephoto end T although the number of C lens shifting areas varies with the V lens shifting area.

In FIG. 14, the C lens shifting speed is shown for the telephoto end area F of the V lens 2. Of the three C lens driving speeds $\vec{V}_{CZ}$, $\vec{V}_{BF}$ and $\vec{V}_{CB}$ mentioned in the foregoing description of other embodiments, FIG. 14 shows only the near-focus correcting speed $\vec{V}_{BF}$. This speed $\vec{V}_{BF}$ is set in eight different speeds for the blocks 0 to 7 at the telephoto end T. Of these eight different values of the near-focus correcting speed $\vec{V}_{BF}$, the near-focus correcting speed $\vec{V}_{BFF0}$ is arranged to shift the C lens 3 to the farthest extent on the far-focus side. The far-focus correcting speed $\vec{V}_{CB}$ which is for shifting the C lens 3 toward a near-focus point is likewise provided for some of the eight blocks corresponding to the area F.

Assuming that a near-focus correcting speed for shifting the C lens 3 to the farthest extent on the far-focus side during a zooming action performed in the W→T direction is $\vec{V}_{BFMAX}$, the maximum far-focus speed (near-focus correcting speed) $\vec{V}_{BFMAX}$ can be set for each of the zoom (V lens shifting) areas 0 to F.

FIG. 16 shows the speeds $\vec{V}_{BF}$ and $\vec{V}_{CB}$ arranged for the above-stated zoom areas, i.e., the V lens shifting areas. In FIG. 16, the suffixes 00 to F0 and 06 to F7 of the speeds $\vec{V}_{BF}$ and $\vec{V}_{CB}$ indicate the addresses 0 to F of the V lens shifting area and the addresses 0 to 7 of the C lens shifting areas representing the blocks to which the speed is assigned in the areas obtained by dividing the V-C curves shown in FIG. 14. The maximum speeds for the near- and far-focus states are thus defined and provided for one of the blocks located in the C lens shifting direction for each of the zoom areas.

In a case where the object distance suddenly comes to extremely change during a zooming action, the defocus correcting speed available by the arrangement of the first embodiment described in the foregoing fails to follow the change. The zooming action is then performed with the image left in a blurred state.

The sudden change of the object distance causes an abrupt drop of the level of the high-frequency component in the video signal as viewed in the focus signal characteristic shown in FIG. 7. Further, in a case where a zooming action is performed without attaining an in-focus state, the characteristic curve of FIG. 7 does not have much up-and-down shape and the level of the high-frequency component does not readily increase.

In the case of this (third) embodiment, therefore, a given threshold value is set for the level of the high-frequency component. When the level fails to reach the threshold value, the C lens is driven at the maximum speed $\vec{V}_{BFMAX}$ or $\vec{V}_{CBMAX}$ according to the blurring direction and to the zoom area where the V lens is located before the C lens driving control is performed in the same manner as in the case of the first embodiment. The C lens is thus promptly shifted at a high speed to an in-focus point on the characteristic curve of FIG. 7.

Figure 15A:
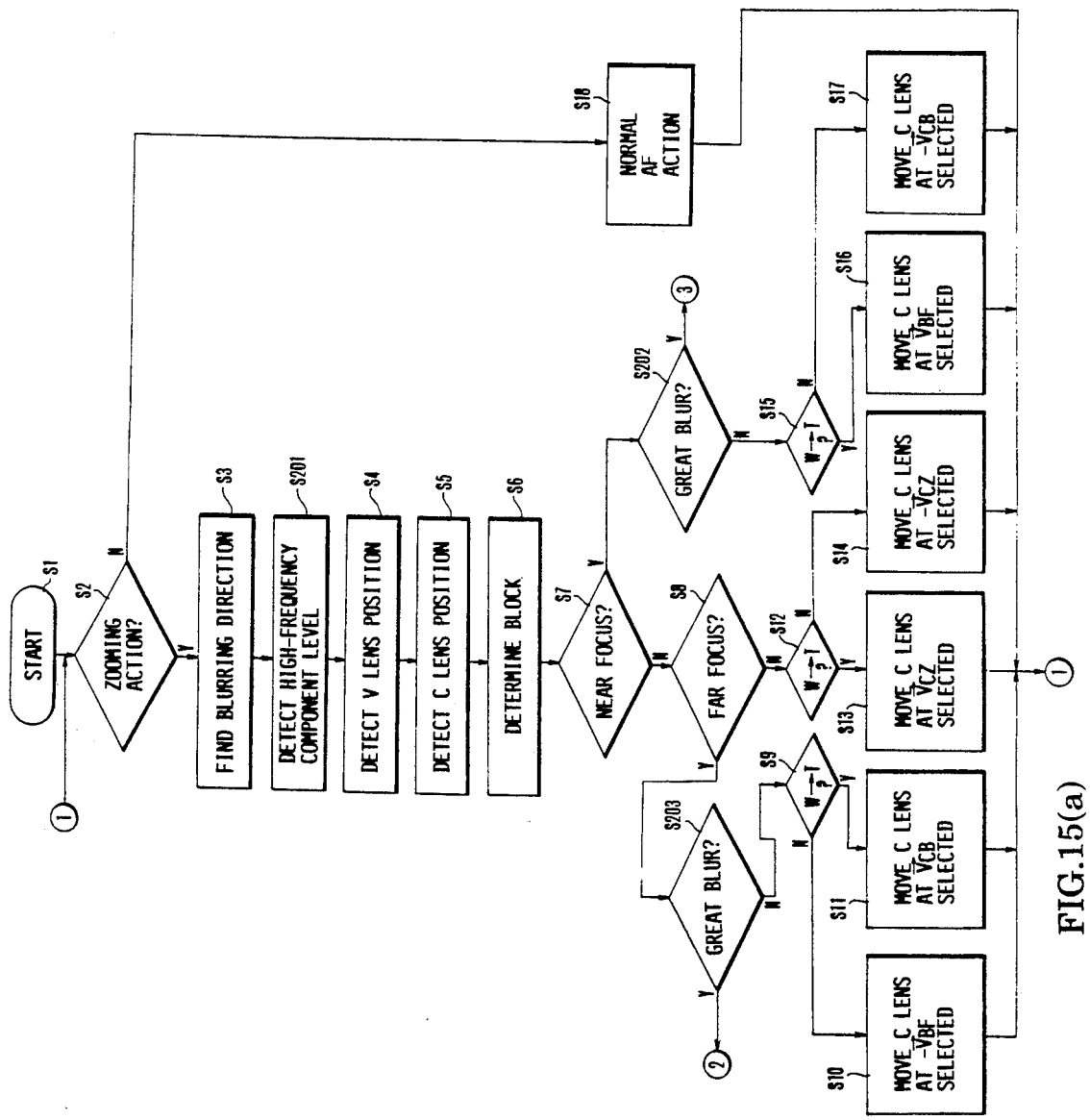
FIGS. 15(a), 15(b) and 15(c) are flow charts showing the control action of the third embodiment.
Figure 15B:
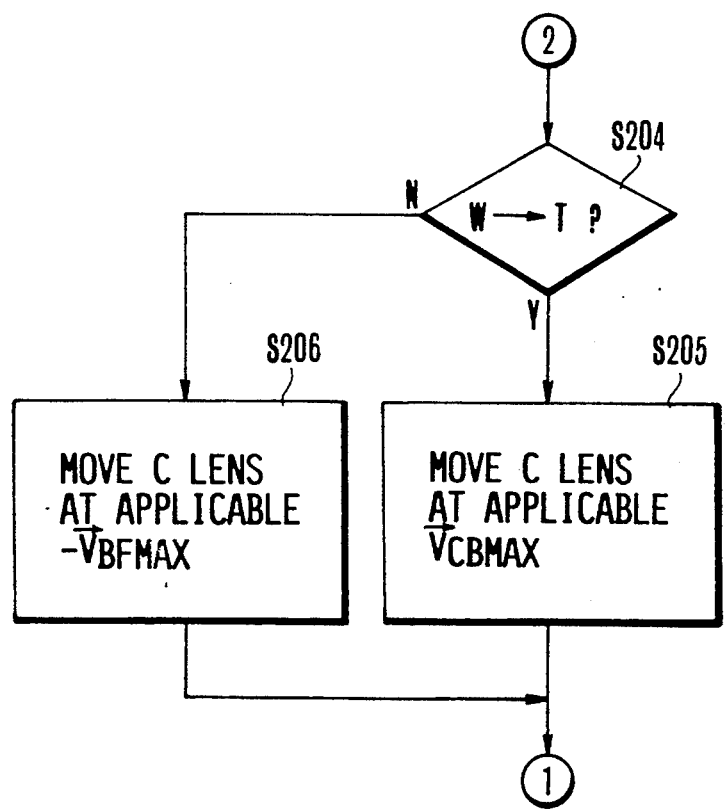
Figure 15C:
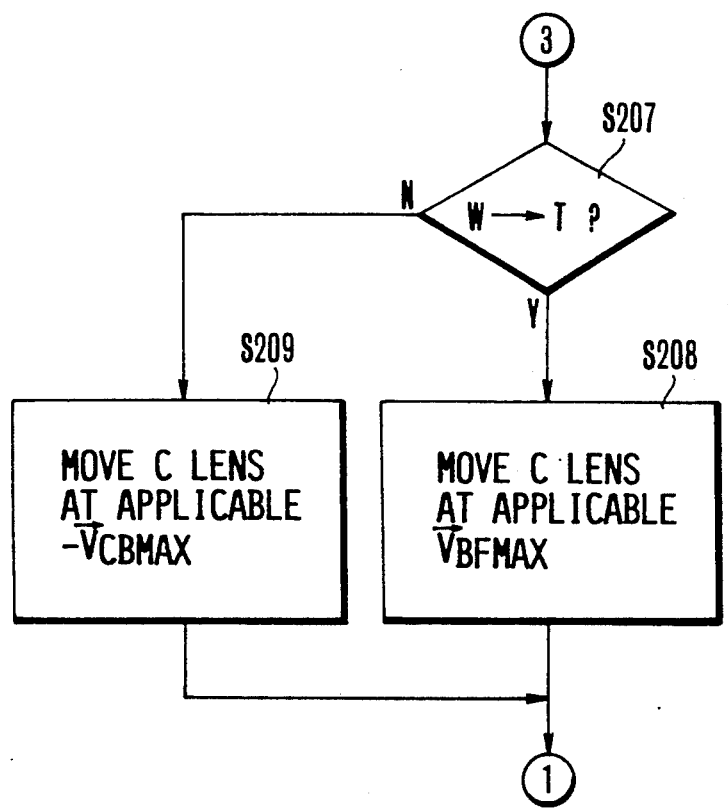

FIGS. 15(a), 15(b) and 15(c) are flow charts showing the flow of control operation of the third embodiment. In these figures, steps to be executed in the same manner as in the flow of control of the first embodiment shown in FIG. 1 are indicated by the same symbols. The flow of control is described as follows:

At a step S1: The camera begins to operate. Step S2: A check is made to see if a zooming action is performed. If not, the flow comes to a step S18 to have a normal AF action performed. When no zooming action is performed, the V lens is in repose. Therefore, under this condition, an in-focus state can be reliably attained by driving the C lens according to the degree of blur.

In a case where a zooming action is found to be performed at the step S2, the flow proceeds to a step S3. At the step S3: The blurring direction is detected. At a step S201: The degree of focus, i.e., the level of the high-frequency component output from the detection circuit 10 is detected and stored. At a step S4: The position of the V lens 2 is detected from the output of the zoom encoder 19. At a step S5: The position of the C lens 3 is detected from the output of the focus encoder 20. At a step S6: One of the blocks of FIG. 14 at which the lens position is currently located is determined on the basis of information on the position of the V lens 2 and that of the C lens. At a step S7: The current position of the C lens 3 is checked to find if it is in a near-focus state. If so, the flow comes to a step S202. At the step S202: The level of the high-frequency component detected at the step S201 is compared with a preset threshold value. It is determined whether or not the image is in a so-called great blur state according to whether the level is below or above the threshold value. If the image is determined to be not in the great blur state with the level of the high-frequency component found to be above the threshold value and thus the C lens 3 can be adequately controlled according to the movement of the V lens 2, the flow comes to a step S15. At the step S15: The control is performed in the same manner as in the case of the first embodiment shown in FIG. 8. Then, either a step S16 or a step S17 is selected according to the zoom lens driving direction. The near-focus correcting speed $\vec{V}_{BF}$ is selected when the V lens 2 is found to be driven in the W→T direction and the near-focus correcting speed $-\vec{V}_{CB}$ is selected when the V lens 2 is driven in the T→W direction. A near-focus state correcting action is thus performed on the C lens 3.

In a case where the level of the high-frequency component is found to be less than the threshold value, thus indicating the great blur state at the step S202, the flow comes to a step S207. At the step S207: A check is made for the direction of the V lens 2. If it is found to be in the W→T direction, the flow proceeds to a step S208. At the step S208: The C lens 3 is driven and shifted to an in-focus point at the maximum value $\vec{V}_{BFMAX}$ of the near-focus correcting speed to be used for the W→T direction. If the V lens driving speed is found to be in the T→W direction at the step S 207, the flow comes to a step S209. At the step S209: The C lens 3 is driven and shifted to an in-focus point at the maximum value $-\vec{V}_{CBMAX}$ of the near-focus correcting speed set for the T→W direction.

Considering this in terms of the state of focus as shown in FIG. 7, the lens position comes to climb the hill-shaped characteristic curve of the high-frequency component level from the near-focus point on the left side of the hill until it reaches the in-focus point.

By this, the lens control can be accomplished along the V-C curve by driving and shifting the C lens 3 to an in-focus point within a short period of time even in the event of such a great blur state that makes it difficult to shift the C lens 3 along the V-C curve following the movement of the V lens 2.

Further, if the lens position is found to be in focus as it is found not in a near-focus state at the step S7 nor in a far-focus state at the step S8, the C lens 3 is shifted accurately while tracing the V-C curve in relation to the movement of the V lens 2 under a zooming action. In this case, the flow comes to a step S12. At the step S12: A check is made for the direction of the zooming action. The flow comes either to a step S13 or to a step S14 according to the result of the check. At the step S13 or S14: The C lens 3 is driven at the standard speed $\vec{V}_{CZ}$ in the W→T direction or at the standard speed $-\vec{V}_{CZ}$ in the T→W direction.

Meanwhile, if the blurring direction is found to be on the far-focus side at the step S8, the flow comes to a step S203. At the step S203: Like at the step S202, the level of the high-frequency component detected at the step S201 is compared with a given threshold value. If the image is found not in the great blur state, the flow comes to a step S9. At the step S9: A check is made for the direction of the zooming action. If it is found to be in the W→T direction, the flow comes to a step S11. At the step S11: The far-focus correcting speed $\vec{V}_{CB}$ which is for the W→T zooming direction is selected and the C lens is driven at this speed. If the zooming action is found to be in the T→W direction at the step S9, the flow comes to a step S10. At the step S10: The far-focus correcting speed $-\vec{V}_{BF}$ which is for the T→W zooming direction is selected and the C lens is driven at that speed. This gradually shifts the C lens 3 from a far-focus point toward a near-focus point on the V-C curve, so that the V-C curve can be accurately traced.

In a case where the image is judged to be in the great blur state at the step S203, the flow comes to a step S204. At the step S204: A check is made for the shifting direction of the V lens 2. If it is found to be in the W→T direction, the flow proceeds to a step S205. At the step S205: The C lens 3 is driven and shifted to an in-focus point at the maximum value $\vec{V}_{CBMAX}$ of the far-focus correcting speed for the W→T direction. If the V lens 2 is found to be shifting in the T→W direction at the step S204, the flow comes to a step S206. At the step S206: The C lens 3 is driven and shifted to an in-focus point at the maximum value $-V_{BFMAX}$ of the far-focus correcting speed for the T→W direction.

Considering this in terms of the state of focus, the lens position climbs the hill shape of the characteristic curve of FIG. 7 which shows the level of the high-frequency component from the right side of the in-focus point until it reaches the in-focus point.

This enables the third embodiment to promptly shift the C lens 3 to the in-focus point even in the event of the great blur state which makes it difficult to shift the C lens 3 following the movement of the V lens 2 along the V-C curve. Therefore, lens control can be accomplished along the V-C curve within a short period of time solely in accordance with the control flow shown in FIG. 8. The lens control is thus performed accurately along the V-C curve irrespectively of the state of focus and the direction in which a zooming action is performed.

With the control performed in the above-stated manner, a blur state can be promptly removed without causing any unnatural focus adjustment even in cases where the great blur state is brought about by an abrupt change of the object distance, etc.

In accordance with the above-stated method for correcting the great blur state, the maximum correction speed is set for every one of the blocks located in the shifting area in which the V lens 2 is located. Therefore, unlike a system arranged to simply shift the lens at a given speed irrespectively of the lens position, the arrangement of the third embodiment effectively prevents any faulty action due to hunting or the like caused by an excessively high C lens correcting speed. The embodiment is, therefore, capable of accomplishing lens control in a very natural, smooth manner.

Further, this invention is advantageously applicable also to apparatuses having a lens system arranged in a manner differing from the lens arrangement of the embodiments described.

In a camera system wherein the lens shifting locus varies in a complex manner in correcting the deviation of focus resulting from a power varying action, any focus deviation that is caused by a change in the object distance during the power varying process can be promptly and reliably corrected irrespectively of the direction of the power varying action. Therefore, the power varying action can be accomplished in a natural manner without bringing about any blur.

Further, an in-focus state is attainable without fail even in cases where a power varying action is performed when the lens is not in focus before and after the power varying action.

Further, focus deviations can be accurately corrected irrespectively of changes taking place in the depth of field. Therefore, the lens can be driven without showing any conspicuous blur during the process of a power varying action.

Further, the lens can be promptly brought back to an in-focus state even when the lens is caused to be out of focus by any sudden change that takes place in the object distance during a power varying action.

Further, in accordance with this invention, a highly reliable camera can be simply arranged without recourse to any complex mechanism and any complex control program.

What is claimed is:

1. A camera comprising:
 a) a first lens group arranged to perform a power varying action;
 b) a second lens group arranged to make focus adjustment and to correct a change taking place in an image forming position according to the movement of said first lens group;
 c) focus detecting means for detecting the degree of focus;
 d) storage means for storing at least a first speed, a second speed and a third speed on each of zones which are selected on the basis of positions of said first lens group and said second lens group, said first speed being a standard speed at which said second lens group is moved to follow said first lens group while maintaining an in-focus state, said second speed being set for shifting said image forming position forward relative to the first speed in the direction of an optical axis and said third speed being set for shifting said image forming position rearward relative to the first speed; and
 e) control means arranged to select the speed of driving said second lens group from said storage means and to determine the direction of driving said second lens group according to an output of said focus detecting means and the direction of the movement of said first lens group.

2. A camera according to claim 1, wherein said storage means stores information on a movement locus of said second lens group along which the movement of said second lens group relative to the moving position of said first lens group causes no blur, said information being set with the position of said second lens group used as a parameter.

3. A camera according to claim 2, wherein said storage means is arranged to divide said movement locus into a plurality of blocks on the basis of the moving position of said first lens group and the position of said second lens group, and wherein information on said three speeds at which said second lens group is moved to follow said first lens group is stored for each of said plurality of blocks.

4. A camera according to claim 3, wherein said control means is arranged to select from among said plurality of divided areas a block corresponding to information on the moving position of said first lens group and information on the position of said second lens group and to drive and control said second lens group on the basis of speed information stored in said block.

5. A camera according to claim 4, wherein said focus detecting means is arranged to detect an in-focus state, a near-focus state and a far-focus state, and wherein said control means is arranged to select one of the three speeds stored in said selected block on the basis of an output of said focus detecting means.

6. A camera according to claim 5, wherein said control means is arranged to drive said second lens group at said first speed in the case of an in-focus state and to select, in the event of defocus, either said second or third speed which is in the direction of correcting the state of defocus according to information on a near- or far-focus state.

7. A camera according to claim 1 or 5, wherein said control means is arranged to select speed information stored in said storage means and to determine the direction (plus or minus sign) thereof according to the moving direction of said first lens group.

8. A camera according to claim 1, further comprising image sensing means arranged to produce an image signal by photo-electrically converting an object image formed thereon through said lens groups, said focus detecting means being arranged to detect the degree of focus according to a signal component which is included in said image signal and which varies according to the degree of focus.

9. An optical control device comprising:
 a) a first element arranged to change a first optical state;
 b) a second element arranged to correct the change of a second optical state taking place according to the movement of said first element;
 c) detecting means for obtaining information on the degree of said second optical state detected;

d) storage means for storing at least a standard speed, a first speed and a second speed on each of zones which are selected on the basis of positions of said first element and said second element, said standard speed being a speed at which said second element is moved to follow the movement of said first element while keeping said second optical state, said first speed being set for shifting said second optical state in a first direction relative to said standard speed and said second speed being set for shifting said second optical state relative to said standard speed in a second direction which differs from said first direction; and e) control means arranged to select and read out from said storage means the shifting speed of said second element and to determine the shifting direction thereof according to an output of said detecting means and the moving direction of said first element.

10. An apparatus according to claim 9, wherein said first optical state is the magnification of an image.

11. An apparatus according to claim 10, wherein said second optical state is an in-focus state, and wherein said detecting means is a focus detecting means.

12. An apparatus according to claim 11, wherein said storage means stores, with the position of said second element stored as a parameter, information on the shifting locus of said second element along which said second element can be shifted in relation to the moving position of said first element without causing any blur, wherein said shifting locus is divided into a plurality of blocks on the basis of the moving position of said first element and the position of said second element, and wherein information on at least said three speeds at which said second element is to be caused to follow said first element is stored for every one of said blocks.

13. An apparatus according to claim 12, wherein said focus detecting means is arranged to detect an in-focus state, a near-focus state and a far-focus state, and wherein said control means is arranged to select on the basis of an output of said focus detecting means one of said three speeds set within an applicable one of said blocks, to drive said second element at said first speed in the case of an in-focus state and to select said second or third speed which is in the direction of correcting a defocus state in the case of the defocus state.

14. A camera comprising:
a) a zoom lens for performing zooming;
b) a compensator lens arranged to adjust focus and correct a change taking place in an image forming position according to the movement of said zoom lens;
c) focus detecting means for detecting the degree of focus;
d) storage means for storing at least a standard speed at which said compensator lens is moved to follow the movement of said zoom lens while maintaining an in-focus state, said storage means being arranged to store three speeds on each of zones which are selected on the basis of positions of said zoom lens and said compensator lens; and
e) control means for controlling the direction and degree of correction of said image forming position by correcting said standard speed in accordance with at least one of an output of said focus detecting means and information on the depth of field.

15. A camera according to claim 14, wherein said storage means stores, with the position of said compensator lens used as a parameter, information on the locus of movement of said compensator along which no blur occurs in relation to the moving position of said zoom lens.

16. A camera according to claim 15, wherein said storage means is arranged to divide said locus of movement into a plurality of blocks on the basis of the moving position of said zoom lens and the position of said compensator lens, and wherein information on speeds required for shifting said compensator lens following said zoom lens is stored in every one of said blocks.

17. A camera according to claim 16, wherein said control means is arranged to select from among said plurality of divided areas a block corresponding to information on the position of said compensator lens and to drive and control said compensator lens on the basis of speed information stored in said block.

18. A camera according to claim 17, wherein said control means includes correction means for correcting on the basis of an output of said focus detecting means said speed information selected and obtained from said storage means.

19. A camera according to claim 18, wherein said correction means is arranged to determine the plus or minus sign of a correction value according to the output of said focus detecting means and to determine said correction value according to said depth of field.

20. A camera comprising:
a) a first lens group arranged to perform a power varying action;
b) a second lens group arranged to make focus adjustment and to correct a change taking place in an image forming position according to the movement of said first lens group;
c) focus detecting means for detecting the degree of focus;
d) storage means for storing at least a standard speed at which said second lens group is moved to follow said first lens group while maintaining an in-focus state, a first speed which is set for shifting said image forming position forward relative to said standard speed in the direction of an optical axis and a second speed which is set for shifting said image forming position rearward relative to said standard speed, said speeds being stored for each of a plurality of lens group shifting areas; and
e) control means arranged to select and obtain from said storage means a second lens group driving speed and determine the direction of a driving action on said second lens group according to an output of said focus detecting means and the moving direction of said first lens group and to set either said first speed or said second speed at a maximum value thereof for said shifting area where said first lens group is located if the degree of focus is below a predetermined value.

21. A camera according to claim 20, wherein said storage means stores information on a movement locus of said second lens group along which the movement of said second lens group relative to the moving position of said first lens group causes no blur, said information being set with the position of said second lens group used as a parameter.

22. A camera according to claim 21, wherein said storage means is arranged to divide said movement locus into a plurality of blocks on the basis of the moving position of said first lens group and the position of said second lens group, and wherein information on said three speeds at which said second lens group is moved to follow said first lens group is stored for each of said plurality of blocks.

23. A camera according to claim 22, wherein said control means is arranged to select from among said plurality of divided areas a block corresponding to information on the moving position of said first lens group and information on the position of said second lens group and to drive and control said second lens group on the basis of speed information stored in said block.

24. A camera according to claim 23, wherein said focus detecting means is arranged to detect an in-focus state, a near-focus state and a far-focus state, and wherein said control means is arranged to select one of the three speeds stored in said selected block on the basis of an output of said focus detecting means.

25. A camera according to claim 24, wherein said control means is arranged to drive said second lens group at said first speed in the case of an in-focus state and to select, in the event of defocus, either said second or third sped which is in the direction of correcting the state of defocus according to information on a near- or far-focus state.

26. A camera according to claim 20 or 24, wherein said control means is arranged to select speed information stored in said storage means and to determine the direction (plus or minus sign) thereof according to the moving direction of said first lens group.

27. A lens control device comprising:
a) a first lens arranged to control a first optical state;
b) a second lens arranged to adjust focus and correct a change occurring in an image forming position according to the movement of said first lens;
c) focus detecting means for detecting the means degree of focus;
d) storage means arranged to store at least a standard speed at which said second lens is moved to follow the movement of said first lens while maintaining an in-focus state, said storage means being arranged to store three speeds on each of said of zones which are selected on the basis of positions of said first lens and said second lens; and
e) control means arranged to correct said standard speed according to information on an output of said focus detecting means and to control the direction in which said image forming position is to be corrected.

28. A device according to claim 27, further comprising detection means for detecting the depth of field of said lens control device.

29. A device according to claim 28, wherein said control means is arranged to control a degree to which said standard speed is to be corrected on the basis of information on said depth of field detected by said detection means.

30. A device according to claim 28 or 29, wherein said control means is provided with an information table in which data of a plurality of correcting degrees is stored and is arranged to read out from said table a correcting degree determined by said depth of field.

31. A device according to claim 27, wherein said storage means is arranged to divide the moving positions of said first lens and the movement locus of said second lens into a plurality of blocks on the basis of the moving position of said first lens and the position of said second lens and to store for each of said blocks information on a representative speed at which said second lens is moved to follow said first lens.

* * * * *

UNITED STATES PATENT AND TRADEMARK OFFICE
CERTIFICATE OF CORRECTION

PATENT NO. : 5,164,756
DATED : November 17, 1992
INVENTOR(S) : Masahide Hirasawa It is certified that error appears in the above-indentified patent and that said Letters Patent is hereby corrected as shown below:

```
Col. 1, line 65, change "diagramtially" to --diagramatically--.
Col. 2, line 68, change "Pat. No. 4,975,714" to --Pat. No. 4,975,724--.
Col. 4, line 50, change "in focus" to -- in-focus --.
Col. 4, line 68, delete "of"
Col. 5, line 6, change "to" to -- with --.
Col. 10, line 11, change "far focus" to --far-focus--.
Col. 10, line 26, change "of" to -- to --.
Col. 11, line 37, change "6" to --8 --.
Col. 11, line 45, after "of" insert -- the --.
Col. 11, line 47, Delete "of".
Col. 12, line 21, change "0+" to -- of --.
Col. 14, line 52, after "to" insert --an--.
Col. 14, line 53, change "extremely" to --extreme--.
Col. 21, line 23, change "sped" to --speed--.
```

Signed and Sealed this

Second Day of November, 1993

Attest:

BRUCE LEHMAN

*Attesting Officer*   *Commissioner of Patents and Trademarks*